(12) United States Patent
Inanoglu

(10) Patent No.: US 7,486,740 B2
(45) Date of Patent: Feb. 3, 2009

(54) CALIBRATION OF TRANSMIT AND RECEIVE CHAINS IN A MIMO COMMUNICATION SYSTEM

(75) Inventor: Hakan Inanoglu, Acton, MA (US)

(73) Assignee: Qualcomm Incorporated, San Diego, CA (US)

( * ) Notice: Subject to any disclaimer, the term of this patent is extended or adjusted under 35 U.S.C. 154(b) by 906 days.

(21) Appl. No.: 10/816,999

(22) Filed: Apr. 2, 2004

(65) Prior Publication Data

US 2005/0227628 A1    Oct. 13, 2005

(51) Int. Cl.
H04L 1/02 (2006.01)

(52) U.S. Cl. .................................................. 375/267
(58) Field of Classification Search .............. 375/219, 375/224, 267, 299, 347, 334; 455/73; 370/294, 370/295
See application file for complete search history.

(56) References Cited

U.S. PATENT DOCUMENTS

| 6,144,711 | A | 11/2000 | Raleigh et al. | 375/347 |
| 7,031,669 | B2* | 4/2006 | Vaidyanathan et al. | 455/84 |
| 7,206,550 | B2* | 4/2007 | Li et al. | 455/73 |
| 2003/0002450 | A1 | 1/2003 | Jalali et al. | 370/294 |
| 2005/0143014 | A1* | 6/2005 | Li et al. | 455/69 |

FOREIGN PATENT DOCUMENTS

DE    19951525 A1    10/1999

WO    WO 99/57820    11/1999

OTHER PUBLICATIONS

Bourdoux et al, "Non-Reciprocal Transcievers in OFDM/SDMA Systems: Impact and Mitigation", 2003, pp. 183-186.
Liu et al, "OFDM-MIMO WLAN AP Front-End Gain and Phase Mismatch Calibration", 2004, pp. 151-154.
Sakaguchi et al, "Comprehensive Calibration for MIMO System", 2002, pp. 440-443.
Nishimori et al, "Automatic Calibration Method Using Transmitting Signals of an Adaptive Array for TDD Systems", 2001, pp. 1636-1640.
Nishimori et al, "A New Calibration Method of Adaptive Array for TDD Systems", 1999, pp. 1444-1447.
Shelton et al, "A Robust Iterative Algorithm for Wireless MIMO Array Auto-Calibration" 2004, pp. II-341-II-344.

* cited by examiner

*Primary Examiner*—Betsy L. Deppe
(74) *Attorney, Agent, or Firm*—Dmitry Milikovsky; Ross L. Franks; Thomas R. Rouse

(57) ABSTRACT

Techniques for calibrating the transmit and receive chains at a wireless entity are described. For a pre-calibration, N first overall gains for a receiver unit and N transmitter units in the transmit chain are obtained, where N>1. Each first overall gain is for a combined response for the receiver unit and the associated transmitter unit. N second overall gains for a transmitter unit and N receiver units in the receive chain are also obtained. Each second overall gain is for a combined response for the transmitter unit and the associated receiver unit. The gain of each transmitter unit and the gain of each receiver unit are determined based on the first and second overall gains. At least one correction matrix is then derived based on the gains of the transmitter and receiver units and is used to account for the responses of these units.

32 Claims, 8 Drawing Sheets

CALIBRATION OF TRANSMIT AND RECEIVE CHAINS IN A MIMO COMMUNICATION SYSTEM

BACKGROUND

I. Field

The present invention relates generally to data communication, and more specifically to techniques for calibrating transmit and receive chains at a wireless entity in a multiple-input multiple-output (MIMO) communication system.

II. Background

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ spatial channels, where $N_S \leq \min \{N_T, N_R\}$. The $N_S$ spatial channels may be used to transmit data in parallel to achieve higher overall throughput or redundantly to achieve greater reliability.

To obtain high performance, it is often necessary to know the response of the entire transmission path from a transmitting entity to a receiving entity. This transmission path, which may be called an "effective" channel, typically includes a transmit chain at the transmitting entity, the MIMO channel, and a receive chain at the receiving entity. The transmit chain includes $N_T$ transmitter units, one transmitter unit for each transmit antenna. Each transmitter unit contains circuitry (e.g., digital-to-analog converter, filter, amplifier, mixer, and so on) that performs signal conditioning on a baseband signal to generate a radio frequency (RF) transmit signal suitable for transmission from the associated transmit antenna. The $N_T$ transmitter units may have different responses due to differences in the circuitry within these units. The receive chain includes $N_R$ receiver units, one receiver unit for each receive antenna. Each receiver unit contains circuitry (e.g., filter, amplifier, mixer, analog-to-digital converter, and so on) that performs signal conditioning on an RF receive signal from the associated receive antenna to obtain a received baseband signal. The $N_R$ receiver units may also have different responses due to differences in the circuitry within these units.

The effective channel response includes the responses of the transmit and receive chains as well as the response of the MIMO channel. Channel estimation may be simplified and performance may be improved if the responses of the transmit and receive chains can be determined and accounted for. The simplification in channel estimation is especially desirable for a MIMO system in which the downlink and uplink share a single frequency band in a time division duplex manner, as described below.

There is, therefore, a need in the art for techniques to calibrate the transmit and receive chains at the transmitting and receiving entities in a MIMO system.

SUMMARY

Techniques for calibrating the transmit and receive chains at a wireless entity are described herein. The wireless entity may be a user terminal or an access point. The responses of the transmit and receive chains may be determined and accounted for by performing a pre-calibration, a field calibration, and/or a follow-on calibration.

For pre-calibration, N first overall gains for a receiver unit and N transmitter units in the transmit chain are obtained, one first overall gain for each transmitter unit, where N>1. Each first overall gain is indicative of a combined response for the receiver unit and the associated transmitter unit. N second overall gains for a transmitter unit and N receiver units in the receive chain are also obtained, one second overall gain for each receiver unit. Each second overall gain is indicative of a combined response for the transmitter unit and the associated receiver unit. The overall gain for transmitter unit i and receiver unit j may be obtained by sending a test signal (e.g., a tone) via transmitter unit i, measuring the test tone received via receiver unit j, and computing the overall complex gain as the ratio of the received test signal level to the sent test signal level. The gain of each transmitter unit is determined based on the N first overall gains, and the gain of each receiver unit is determined based on the N second overall gains. At least one correction matrix is then derived based on the gains of the N transmitter units and the gains of the N receiver units. The at least one correction matrix is used to account for the responses of the transmitter and receiver units at the wireless entity.

For field calibration, an access point transmits a MIMO pilot (described below) on the downlink, and a user terminal transmits a MIMO pilot on the uplink. Estimates of the MIMO channel responses for the downlink and uplink are obtained based on the downlink and uplink MIMO pilots, respectively, and used to derive at least one updated correction matrix for each wireless entity, as described below. The updated correction matrices for both wireless entities may be used in place of the correction matrices obtained for these entities via pre-calibration.

For follow-on calibration, one wireless entity (e.g., the access point) transmits two different pilots, and the other wireless entity (e.g., the user terminal) estimates the errors in the correction matrices for the access point and the user terminal based on the pilots, as described below. The correction matrices for both wireless entities may then be updated based on the determined errors.

In general, pre-calibration, field calibration, and follow-on calibration may be performed at any time and in any order. Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
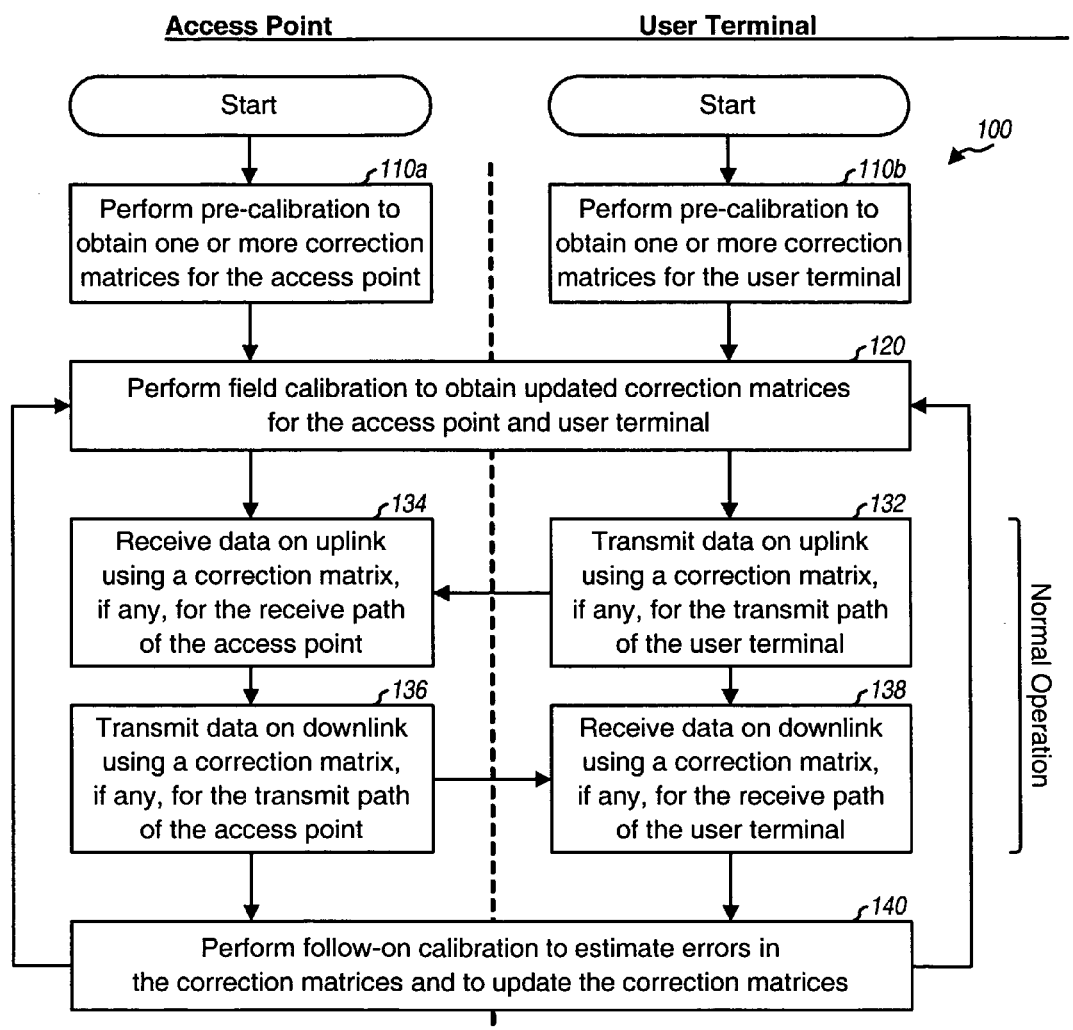
FIG. 1 shows an overall process for calibration and normal operation.

FIG. 1 shows a flow diagram of a process 100 performed by an access point and a user terminal for calibration and normal operation. Initially, pre-calibration may be performed separately for the access point (block 110*a*) and the user terminal (block 110*b*) to derive correction matrices that may be used to account for the responses of the transmit/receive chains at these entities. The pre-calibration may be performed during manufacturing, after deployment, or at some other time. Field calibration may be performed jointly by the access point and the user terminal in the field to obtain updated correction matrices for these entities (block 120).

For normal operation, the user terminal may transmit data on the uplink using a correction matrix, if any, for the transmit path of the user terminal (block 132). The access point may receive the uplink transmission using a correction matrix, if any, for the receive path of the access point (block 134). The access point may also transmit data on the downlink using a correction matrix, if any, for the transmit path of the access point (block 136). The user terminal may receive the downlink transmission using a correction matrix, if any, for the receive path of the user terminal (block 138).

Follow-on calibration may be performed jointly by the access point and the user terminal to estimate the errors in the correction matrices and to update the correction matrices for these entities (block 140). In general, pre-calibration, field calibration, follow-on calibration, or any combination thereof may be performed to obtain the correction matrices for the access point and user terminal. Furthermore, the different types of calibration may be performed at any time and in any order.

A MIMO system may utilize a frequency division duplex (FDD) or a time division duplex (TDD) channel structure. For an FDD MIMO system, the downlink and uplink are allocated separate frequency bands, and the MIMO channel response for one link may not correlate well with the MIMO channel response for the other link. In this case, the responses of the transmit and receive chains for each wireless entity may be determined (e.g., by performing pre-calibration), and each chain may be accounted for with a respective correction matrix, as described below.

For a TDD MIMO system, the downlink and uplink share the same frequency band, with the downlink being allocated a portion of the time and the uplink being allocated the remaining portion of the time. The MIMO channel response for one link may be highly correlated with the MIMO channel response for the other link and may even be assumed to be reciprocal of one another. That is, if $\underline{H}$ represents a channel response matrix from antenna array A to antenna array B, then a reciprocal channel implies that the coupling from array B to array A is given by $\underline{H}^T$, where "$T$" denotes a transpose. Channel estimation may be simplified for a reciprocal channel since the channel response for one link (e.g., the uplink) may be estimated based on a pilot received via the other link (e.g., the downlink). For a TDD MIMO system, calibration may be performed in a manner to take advantage of the correlation between the downlink and uplink channel responses, as described below.

Pre-calibration, field calibration, and/or follow-on calibration may be performed to derive correction matrices for the transmit path, the receive path, or both the transmit and receive paths at the access point and user terminal, as described below. For simplicity, the following description assumes a noise-free environment and channel estimation without errors. Thus, noise terms are not shown in the equations below. Also, the receiver units are assumed to have sufficient (e.g., 30 dB or more) isolation among one another.

1. Pre-Calibration

Figure 2:
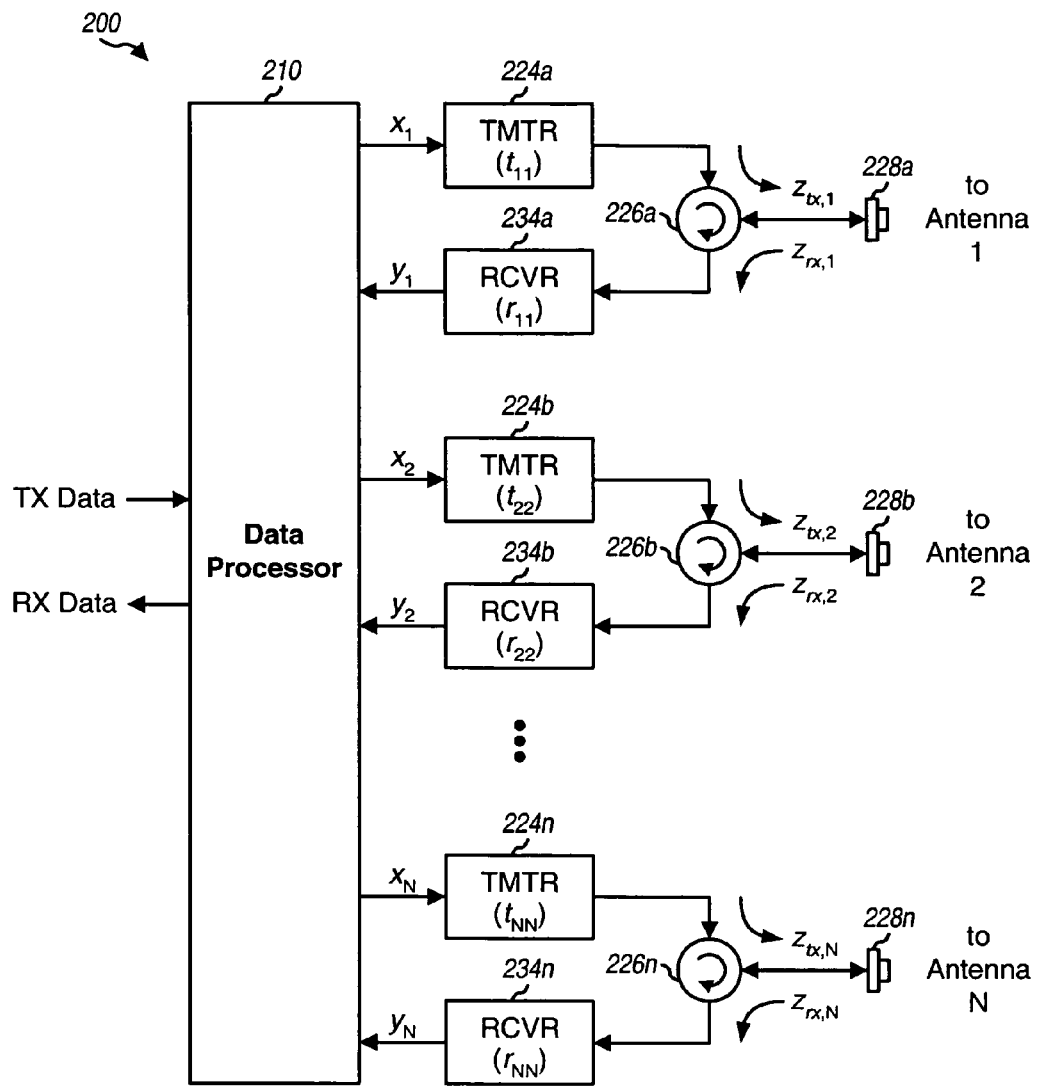
FIG. 2 shows a block diagram of a wireless entity.

FIG. 2 shows a block diagram of a wireless entity 200 equipped with N antennas, where N>1. Wireless entity 200 may be a user terminal, which may also be called a wireless device, a mobile station, or some other terminology. Wireless entity 200 may also be an access point, which may also be called a base station or some other terminology.

On the transmit path, a data processor 210 receives and processes (e.g., encodes, interleaves, and modulates) data to obtain data symbols. As used herein, a "data symbol" is a modulation symbol for data, and a "pilot symbol" is a modulation symbol for pilot. Pilot symbols are known a priori by both the transmitting and receiving entities. Data processor 210 may further perform spatial processing on the data symbols and provides N streams of transmit symbols to N transmitter units (TMTR) 224a through 224n. As used herein, a "transmit symbol" is a symbol to be transmitted from an antenna. Each transmitter unit 224 processes its transmit symbol stream to generate an RF transmit signal, which is then routed through a circulator 226 and via an antenna connector 228 to an antenna (not shown in FIG. 2). The processing by each transmitter unit 224 typically includes digital-to-analog conversion, amplification, filtering, and frequency upconversion.

On the receive path, one or more RF transmit signals (e.g., from another wireless entity) are received by each of the N antennas (not shown in FIG. 2) at wireless entity 200. The RF receive signal from each antenna is provided via connector 228 and routed through circulator 226 to an associated receiver unit (RCVR) 234. Each receiver unit 234 processes its RF receive signal and provides a stream of received symbols to data processor 210. The processing by each receiver unit 234 typically includes frequency downconversion, amplification, filtering, and analog-to-digital conversion. Data processor 210 performs receiver spatial processing (or spatial matched filtering) on the received symbols from all N receiver units 234a through 234n to obtain detected symbols, which are estimates of the data symbols sent by the other wireless entity. Data processor 210 further processes (e.g., demodulates, deinterleaves, and decodes) the detected symbols to obtain decoded data.

The signals for the transmit path at wireless entity 200 may be expressed as:

$$\underline{z}_{tx} = \underline{T}\underline{x}, \qquad \text{Eq (1)}$$

where $\underline{x} = [x_1 \, x_2 \ldots x_N]^T$ is a vector with N transmit (TX) baseband signals for the N antennas, where $x_i$ is the TX baseband signal for antenna i;

$\underline{T}$ is a diagonal matrix with N complex gains for the N transmitter units; and $\underline{z}_{tx} = [z_{tx,1} \, z_{tx,2} \ldots z_{tx,N}]^T$ is a vector with N RF transmit signals for the N antennas, where $z_{tx,i}$ is the RF transmit signal for antenna i.

The signals for the receive path at wireless entity 200 may be expressed as:

$$\underline{y} = \underline{R}\underline{z}_{rx}, \qquad \text{Eq (2)}$$

where $\underline{z}_{rx} = [z_{rx,1} \, z_{rx,2} \ldots z_{rx,N}]^T$ is a vector with N RF receive signals for the N antennas, where $z_{rx,i}$ is the RF receive signal for antenna i;

$\underline{R}$ is a diagonal matrix with N complex gains for the N receiver units; and $\underline{y} = [y_1 \, y_2 \ldots y_N]^T$ is a vector with N receive (RX) baseband signals for the N antennas, where $y_i$ is the RX baseband signal for antenna i.

The RF and baseband signals are a function of time, but this is not indicated above for simplicity.

The matrices $\underline{T}$ and $\underline{R}$ are of dimension N×N and may be expressed as:

$$\underline{T} = \begin{bmatrix} t_{11} & 0 & \cdots & 0 \\ 0 & t_{22} & \cdots & 0 \\ \vdots & \vdots & \ddots & \vdots \\ 0 & 0 & \cdots & t_{NN} \end{bmatrix} \text{ and } \underline{R} = \begin{bmatrix} r_{11} & 0 & \cdots & 0 \\ 0 & r_{22} & \cdots & 0 \\ \vdots & \vdots & \ddots & \vdots \\ 0 & 0 & \cdots & r_{NN} \end{bmatrix}, \quad \text{Eq (3)}$$

where $t_{ii}$ is the complex gain for transmitter unit i and $r_{ii}$ is the complex gain for receiver unit i, for i=1 ... N. The responses of the transmitter and receiver units are typically a function of frequency. For simplicity, a flat frequency response is assumed for the transmitter and receiver units. In this case, the response of each transmitter unit is represented by a single complex gain $t_{ii}$, and the response of each receiver unit is also represented by a single complex gain $r_{ii}$.

Figure 3:
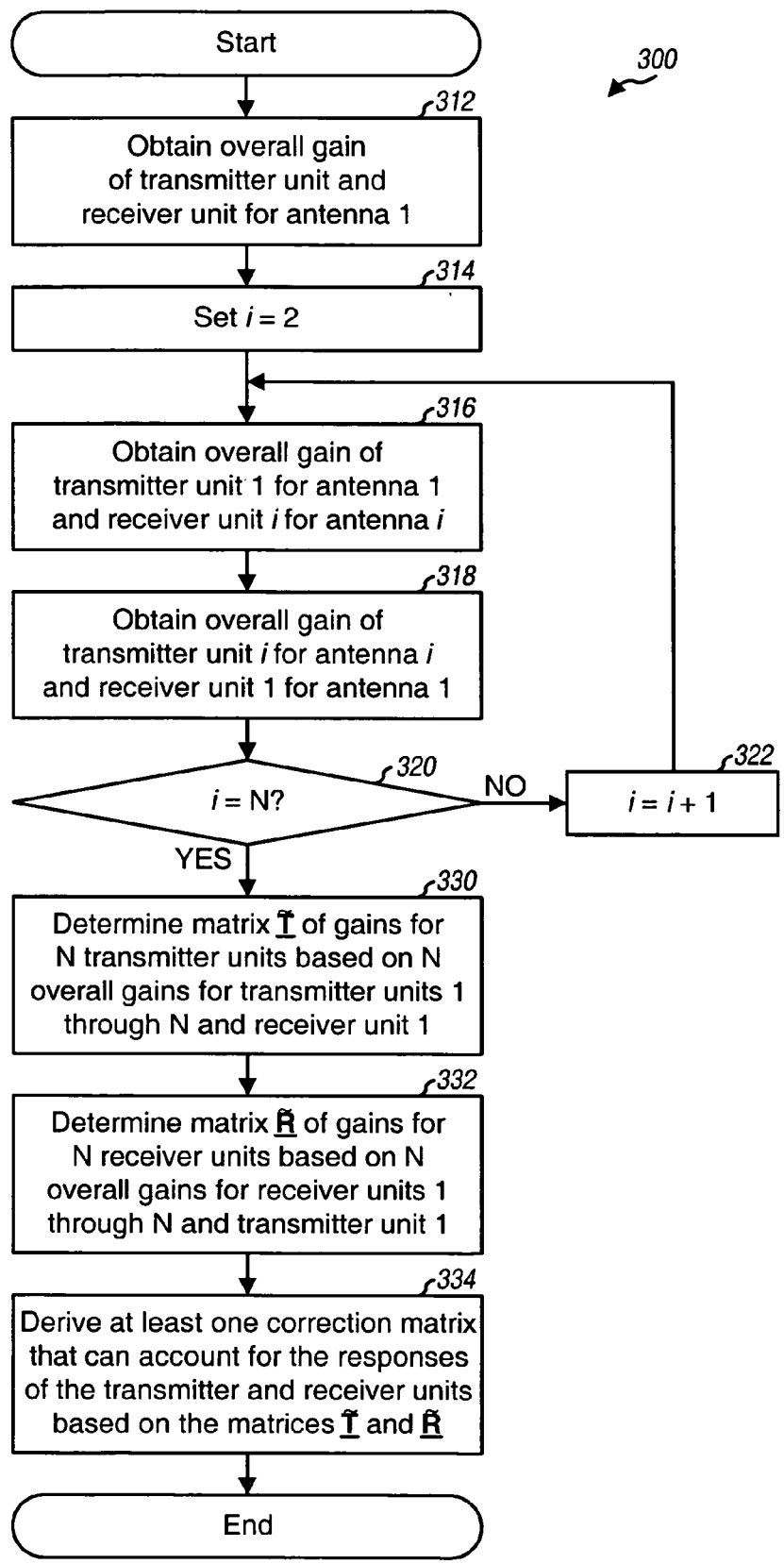
FIG. 3 shows a process for performing pre-calibration.

FIG. 3 shows a flow diagram of a process 300 for performing pre-calibration for wireless entity 200. Process 200 is described below with reference to FIG. 2.

An overall gain $r_{11} \cdot t_{11}$ of the transmitter unit and receiver unit for antenna 1 is first obtained (block 312). This may be achieved, for example, by short-circuiting connector 228a for antenna 1 with a termination connector having a center conductor connected to circuit ground. With connector 228a short circuited, the RF transmit signal $z_{tx,1}$ and the RF receive signal $z_{rx,1}$ at a point between circulator 226a and connector 228a may be expressed as:

$$z_{rx,1} = -z_{tx,1}, \quad \text{Eq (4)}$$

where the signal inversion is due to the short circuit at connector 228a. A TX baseband signal $x_1$ (e.g., a single tone) is then applied to transmitter unit 224a and an RX baseband signal $y_1$ at the output of receiver unit 234a is measured. The TX baseband signal level should be such that the reflected signal from the short-circuited antenna port should not cause any damage. The RF transmit signal $z_{tx,1}$ and the RX baseband signal $y_1$ may be expressed as:

$$z_{tx,1} = t_{11} \cdot x_1, \text{ and} \quad \text{Eq (5)}$$

$$y_1 = r_{11} \cdot z_{rx,1} = -r_{11} \cdot z_{tx,1}, \quad \text{Eq (6)}$$

where the rightmost quantity in equation (6) is obtained using equation (4). Combining equations (5) and (6), the following is obtained:

$$r_{11} \cdot t_{11} = -\frac{y_1}{x_1}. \quad \text{Eq (7)}$$

Equation (7) indicates that the overall gain $r_{11} \cdot t_{11}$ may be obtained as the negative of the ratio of the TX baseband signal level to the RX baseband signal level for antenna 1, with connector 228a shorted.

In FIG. 3, an index i is then initialized to 2 (block 314). An overall gain $r_{ii} \cdot t_{11}$ of transmitter unit 1 for antenna 1 and receiver unit i for antenna i is obtained (block 316). An overall gain $r_{11} \cdot t_{ii}$ of transmitter unit i for antenna i and receiver unit 1 for antenna 1 is also obtained (block 318). The overall gains $r_{ii} \cdot t_{11}$ and $r_{11} \cdot t_{ii}$ may be obtained as follows. The termination connector is removed from connector 228a and a test cable with a known characteristic is connected between connector 228a for antenna 1 and connector 228i for antenna i. A TX baseband signal $x_1$ (e.g., a single tone) is applied to transmitter unit 224a and an RX baseband signal $y_i$ from receiver unit 234i for antenna i is measured. The RX baseband signal $y_i$ may be expressed as:

$$y_i = r_{ii} \cdot z_{rx,i} = r_{ii} \cdot \alpha_{cable} \cdot z_{tx,1} = r_{ii} \cdot \alpha_{cable} \cdot t_{11} \cdot x_1, \quad \text{Eq (8)}$$

where $\alpha_{cable}$ is a known complex value for the loss and phase shift of the test cable. The overall gain $r_{ii} \cdot t_{11}$ may then be computed as:

$$r_{ii} \cdot t_{11} = \frac{1}{\alpha_{cable}} \cdot \frac{y_i}{x_1}. \quad \text{Eq (9)}$$

Similarly, a TX baseband signal $x_i$ (e.g., a single tone) is applied to transmitter unit 224i for antenna i and the RX baseband signal $x_1$ from receiver unit 234a is measured. The RX baseband signal $y_1$ may be expressed as:

$$y_1 = r_{11} \cdot z_{rx,1} = r_{11} \cdot \alpha_{cable} \cdot z_{tx,i} = r_{11} \cdot \alpha_{cable} \cdot t_{ii} \cdot x_i. \quad \text{Eq (10)}$$

The overall gain $r_{11} \cdot t_{ii}$ may then be computed as:

$$r_{11} \cdot t_{ii} = \frac{1}{\alpha_{cable}} \cdot \frac{y_1}{x_i}. \quad \text{Eq (11)}$$

Equations (9) and (11) indicate that an overall gain $r_{ii} \cdot t_{jj}$ may be obtained as a scaled version of the ratio of the RX baseband signal level for antenna i to the TX baseband signal level for antenna j, where the scaling is by $1/\alpha_{cable}$.

A determination is then made whether index i is equal to N (block 320). If the answer is 'no', then index i is incremented by one (block 322) and the process returns to block 316 to determine another pair of overall gains for another antenna. Otherwise, if the answer is 'yes' for block 320, then the process proceeds to block 330.

FIG. 2 shows the use of circulators 226 to route (1) the TX baseband signals from transmitter units 224 to the antennas and (2) the RF receive signals from the antennas to receiver units 234. Circulators are typically used for a TDD system in which the downlink and uplink share the same frequency band. Switches may also be used for the TDD system to route signal to and from the antennas. In this case, the overall gain $r_{11} \cdot t_{11}$ for antenna 1 is not obtained by shorting connector 228a but may be obtained as:

$$r_{11} \cdot t_{11} = \frac{(r_{11} \cdot t_{ii}) \cdot (r_{jj} \cdot t_{11})}{r_{jj} \cdot t_{ii}},$$

where $r_{jj} \cdot t_{ii}$ is the overall gain for receiver unit j and transmitter unit i.

Block 312 provides the overall gain $r_{11} \cdot t_{11}$ for antenna 1. The N−1 iterations of blocks 316 and 318 provide 2(N−1) overall gains, $r_{11} \cdot t_{22}$ through $r_{11} \cdot t_{NN}$ and $r_{22} \cdot t_{11}$ through $r_{NN} \cdot t_{11}$, for antenna 1 and each of antennas 2 through N. A matrix $\underline{\tilde{T}}$ of gains for the N transmitter units may be obtained based on the N overall gains $r_{11} \cdot t_{11}$ through $r_{11} \cdot t_{NN}$ for the N transmitter units and receiver unit 1 (block 330), as follows:

$$\underline{\tilde{T}} = \begin{bmatrix} r_{11} \cdot t_{11} & 0 & \cdots & 0 \\ 0 & r_{11} \cdot t_{22} & \cdots & 0 \\ \vdots & \vdots & \ddots & \vdots \\ 0 & 0 & \cdots & r_{11} \cdot t_{NN} \end{bmatrix} \quad \text{Eq (12)}$$

-continued $$\tilde{T} = (r_{11} \cdot t_{11}) \cdot \begin{bmatrix} 1 & 0 & \cdots & 0 \\ 0 & \frac{t_{22}}{t_{11}} & \cdots & 0 \\ \vdots & \vdots & \ddots & \vdots \\ 0 & 0 & \cdots & \frac{t_{NN}}{t_{11}} \end{bmatrix}$$

$$= r_{11} \cdot T.$$

Equation (12) indicates that $\tilde{T}$ is a scaled version of $T$, where the scaling is by $r_{11}$.

Similarly, a matrix $\tilde{R}$ of gains for the N receiver units may be obtained based on the N overall gains $r_{11} \cdot t_{11}$ through $r_{NN} \cdot t_{11}$ for transmitter unit 1 and the N receiver units (block 332), as follows:

$$\tilde{R} = \begin{bmatrix} r_{11} \cdot t_{11} & 0 & \cdots & 0 \\ 0 & r_{22} \cdot t_{11} & \cdots & 0 \\ \vdots & \vdots & \ddots & \vdots \\ 0 & 0 & \cdots & r_{NN} \cdot t_{11} \end{bmatrix} \quad \text{Eq (13)}$$

$$= (r_{11} \cdot t_{11}) \cdot \begin{bmatrix} 1 & 0 & \cdots & 0 \\ 0 & \frac{r_{22}}{r_{11}} & \cdots & 0 \\ \vdots & \vdots & \ddots & \vdots \\ 0 & 0 & \cdots & \frac{r_{NN}}{r_{11}} \end{bmatrix}$$

$$= t_{11} \cdot R.$$

Equation (13) indicates that $\tilde{R}$ is a scaled version of $R$ where the scaling is by $t_{11}$.

At least one correction matrix that can account for the responses of the transmitter and receiver units may be derived based on the matrices $\tilde{T}$ and $\tilde{R}$ (block 334), as described below. The process then terminates.

Figure 4:
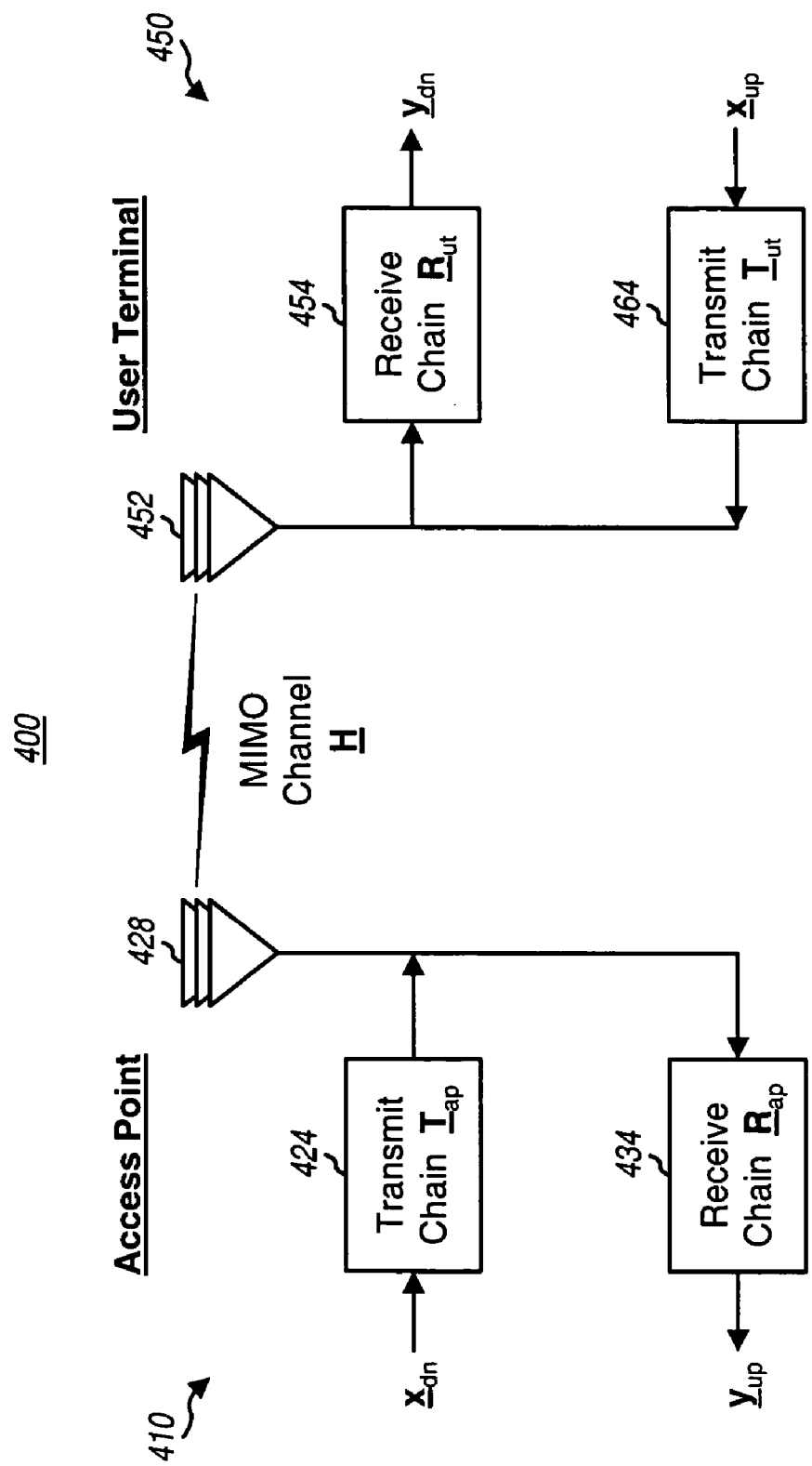
FIG. 4 shows the transmit and receive chains at an access point and a user terminal.

FIG. 4 shows a block diagram of the transmit and receive chains at an access point 410 and a user terminal 450 in a MIMO system 400. For the downlink, at access point 410, transmit symbols (denoted by a vector $\underline{x}_{dn}$) are processed by a transmit chain 424 and transmitted from $N_{ap}$ antennas 428 and over a wireless MIMO channel. At user terminal 450, $N_{ap}$ downlink signals are received by $N_{ut}$ antennas 452 and processed by a receive chain 454 to obtain received symbols (denoted by a vector $\underline{y}_{dn}$). For the uplink, at user terminal 450, transmit symbols (denoted by a vector $\underline{x}_{up}$) are processed by a transmit chain 464 and transmitted from $N_{ut}$ antennas 452 and over the MIMO channel. At access point 410, $N_{ut}$ uplink signals are received by $N_{ap}$ antennas 428 and processed by a receive chain 434 to obtain received symbols (denoted by a vector $\underline{y}_{up}$).

Transmit chain 424 includes $N_{ap}$ transmitter units for the $N_{ap}$ access point antennas and is characterized by a diagonal matrix $\underline{T}_{ap}$ with $N_{ap}$ complex gains for the $N_{ap}$ transmitter units, or $\text{diag}(\underline{T}_{ap}) = \{t_{ap,11} \, t_{ap,22} \ldots t_{ap,N_{ap}N_{ap}}\}$. Receiver chain 434 includes $N_{ap}$ receiver units for the $N_{ap}$ access point antennas and is characterized by a diagonal matrix $\underline{R}_{ap}$ with $N_{ap}$ complex gains for the $N_{ap}$ receiver units, or $\text{diag}(\underline{R}_{ap}) = \{r_{ap,11} \, r_{ap,22} \ldots r_{ap,N_{ap}N_{ap}}\}$. Pre-calibration may be performed for access point 410 to obtain matrices $\tilde{\underline{T}}_{ap}$ and $\tilde{\underline{R}}_{ap}$, which are scaled versions of $\underline{T}_{ap}$ and $\underline{R}_{ap}$, respectively, as described above for FIG. 3.

Similarly, transmit chain 464 includes $N_{ut}$ transmitter units for the $N_{ut}$ user terminal antennas and is characterized by a diagonal matrix $\underline{T}_{ut}$ with $N_{ut}$ complex gains for the $N_{ut}$ transmitter units, or $\text{diag}(\underline{T}_{ut}) = \{t_{ut,11} \, t_{ut,22} \ldots t_{ut,N_{ut}N_{ut}}\}$. Receive chain 454 includes $N_{ut}$ receiver units for the $N_{ut}$ user terminal antennas and is characterized by a diagonal matrix $\underline{R}_{ut}$ with $N_{ut}$ complex gains for the $N_{ut}$ receiver units, or $\text{diag}(\underline{R}_{ut}) = \{r_{ut,11} \, r_{ut,22} \ldots r_{ut,N_{ut}N_{ut}}\}$. Pre-calibration may also be performed for user terminal 450 to obtain matrices $\tilde{\underline{T}}_{ut}$ and $\tilde{\underline{R}}_{ut}$, which are scaled versions of $\underline{T}_{ut}$ and $\underline{R}_{ut}$, respectively.

The following relationships may be expressed based on equations (12) and (13):

$$\tilde{\underline{T}}_{ap} = r_{ap,11} \cdot \underline{T}_{ap}, \quad \text{Eq (14)}$$

$$\tilde{\underline{R}}_{ap} = t_{ap,11} \cdot \underline{R}_{ap}, \quad \text{Eq (15)}$$

$$\tilde{\underline{T}}_{ut} = r_{ut,11} \cdot \underline{T}_{ut}, \quad \text{Eq (16)}$$

$$\tilde{\underline{R}}_{ut} = t_{ut,11} \cdot \underline{R}_{ut}, \quad \text{Eq (17)}$$

where $t_{ap,11}$ is the gain of the transmitter unit for access point antenna 1;

$r_{ap,11}$ is the gain of the receiver unit for access point antenna 1;

$t_{ut,11}$ is the gain of the transmitter unit for user terminal antenna 1; and $r_{ut,11}$ is the gain of the receiver unit for user terminal antenna 1.

In an embodiment, the response of each transmit and receive chain is accounted for based on a correction matrix derived for that chain. The correction matrix for each chain may be computed as the inverse of the diagonal matrix for that chain. A correction matrix for a transmit chain is applied prior to the transmit chain, and a correction matrix for a receive chain is applied after the receive chain.

Figure 5:
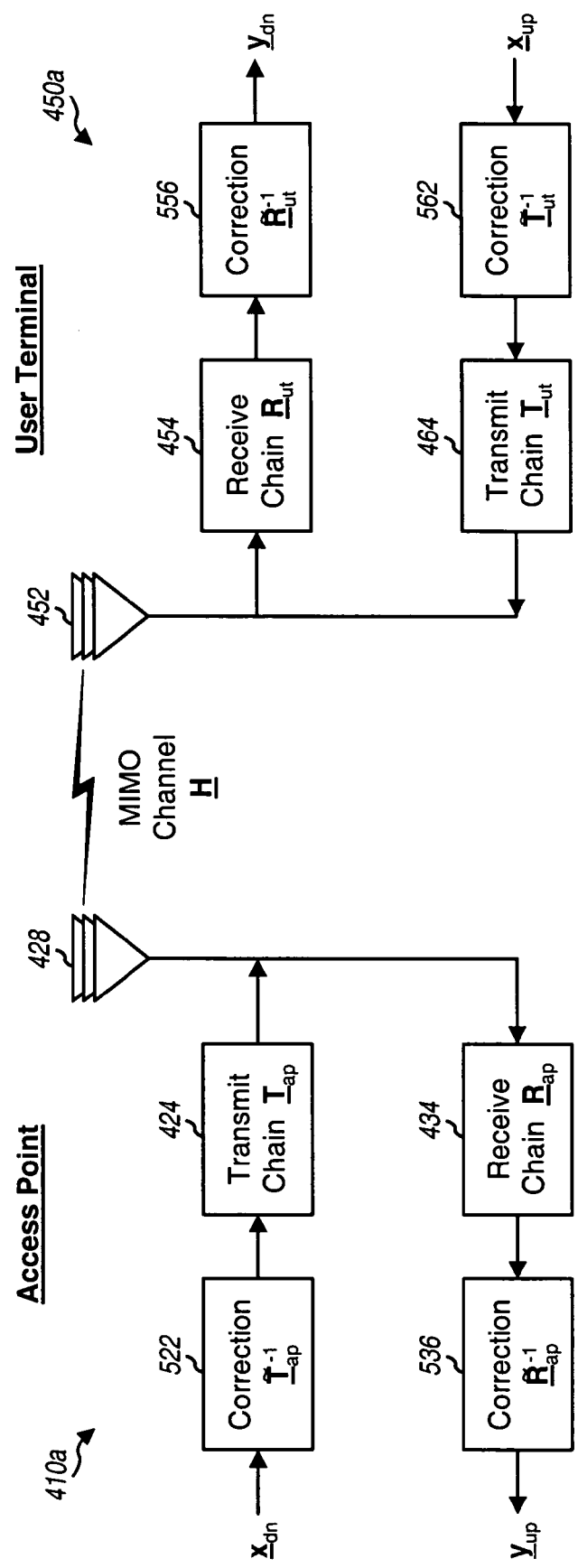
FIG. 5 shows the use of a correction matrix for each transmit and receive chain.

FIG. 5 shows the use of a separate correction matrix to account for the response of each transmit and receive chain at an access point 410a and a user terminal 450a. On the downlink, at access point 410a, the transmit vector $\underline{x}_{dn}$ is first multiplied with a correction matrix $\tilde{\underline{T}}_{ap}^{-1}$ by a unit 522, processed by transmit chain 424, and transmitted from $N_{ap}$ antennas 428. At user terminal 450a, the $N_{ap}$ downlink signals are received by $N_{ut}$ antennas 452, processed by receive chain 454, and further multiplied with a correction matrix $\tilde{\underline{R}}_{ut}^{-1}$ by a unit 556 to obtain the received vector $\underline{y}_{dn}$.

On the uplink, at user terminal 450a, the transmit vector $\underline{x}_{up}$ is first multiplied with a correction matrix $\tilde{\underline{T}}_{ut}^{-1}$ by a unit 562, processed by transmit chain 464, and transmitted from $N_{ut}$ antennas 452. At access point 410a, the $N_{ut}$ uplink signals are received by $N_{ap}$ antennas 428, processed by receive chain 434, and further multiplied with a correction matrix $\tilde{\underline{R}}_{ap}^{-1}$ by a unit 536 to obtain the received vector $\underline{y}_{up}$.

The combined gain of unit 522 and transmit chain 424 may be computed as $(1/r_{ap,11}) \cdot \underline{I}$, where $\underline{I}$ is the identity matrix with ones along the diagonal and zeros elsewhere. Similarly, the combined gain of receive chain 434 and unit 536 may be computed as $(1/t_{ap,11}) \cdot \underline{I}$, the combined gain of receive chain 454 and unit 556 may be computed as $(1/t_{ut,11}) \cdot \underline{I}$, and the combined gain of unit 562 and transmit chain 464 may be computed as $(1/r_{ut,11}) \cdot \underline{I}$. The use of a correction matrix for each transmit/receive chain results in an essentially flat response across the transmitter/receiver units in that chain. The scaling factor (e.g., $1/r_{ap,11}$) may be accounted for by simply scaling the transmit symbols and/or the transmit power for all antennas by the same amount.

For a reciprocal channel (e.g., a TDD MIMO system), the channel response matrix for the downlink may be denoted as $\underline{H}$, and the channel response matrix for the uplink may be denoted as $\underline{H}^T$. The received vectors for the downlink and uplink, without any correction matrices, may be expressed as:

$$\underline{y}_{dn} = \underline{R}_{ut}\underline{H}\underline{T}_{ap}\underline{x}_{dn}, \text{ and} \qquad \text{Eq (18)}$$

$$\underline{y}_{up} = \underline{R}_{ap}\underline{H}^T\underline{T}_{ut}\underline{x}_{up}. \qquad \text{Eq (19)}$$

From equations (18) and (19), the "effective" downlink and uplink channel responses, $\underline{H}_{dn}$ and $\underline{H}_{up}$, which include the responses of the applicable transmit and receive chains, may be expressed as:

$$\underline{H}_{dn} = \underline{R}_{ut}\underline{H}\underline{T}_{ap} \text{ and } \underline{H}_{up} = \underline{R}_{ap}\underline{H}^T\underline{T}_{ut}. \qquad \text{Eq (20)}$$

As shown in equation set (20), if the responses of the transmit and receive chains at the access point are not equal to the responses of the transmit and receive chains at the user terminal, then the effective downlink and uplink channel responses are not reciprocal of one another, or $\underline{R}_{ut}\underline{H}\underline{T}_{ap} \ne (\underline{R}_{ap}\underline{H}^T\underline{T}_{ut})^T$.

In another embodiment, the responses of the transmit and receive chains at each wireless entity are accounted for by a single correction matrix applied on the transmit path prior to the transmit chain. The two equations in equation set (20) may be combined to obtain the following:

$$\underline{H}_{up}^T = \underline{T}_{ut}\underline{R}_{ut}^{-1}\underline{H}_{dn}\underline{T}_{ap}^{-1}\underline{R}_{ap} = \underline{K}_{uttx}^{-1}\underline{H}_{dn}\underline{K}_{aptx} \text{ or } \underline{H}_{up} = (\underline{K}_{uttx}^{-1}\underline{H}_{dn}\underline{K}_{aptx}), \qquad \text{Eq (21)}$$

where $\underline{K}_{aptx} = \underline{T}_{ap}^{-1}\underline{R}_{ap}$ and $\underline{K}_{uttx} = \underline{T}_{ut}^{-1}\underline{R}_{ut}$. $\underline{K}_{aptx}$ is an $N_{ap} \times N_{ap}$ diagonal matrix for the access point and is equal to the ratio of the receive chain response $\underline{R}_{ap}$ to the transmit chain response $\underline{T}_{ap}$, where the ratio is taken element by element. Similarly, $\underline{K}_{uttx}$ is an $N_{ut} \times N_{ut}$ diagonal matrix for the user terminal and is equal to the ratio of the receive chain response $\underline{R}_{ut}$ to the transmit chain response $\underline{T}_{ut}$.

Equation (21) may also be expressed as:

$$\underline{H}_{cup} = \underline{H}_{up}\underline{K}_{uttx} = (\underline{H}_{dn}\underline{K}_{aptx})^T = \underline{H}_{cdn}^T, \qquad \text{Eq (22)}$$

where
$\underline{H}_{up}$ is the calibrated channel response for the uplink; and
$\underline{H}_{cdn}$ is the calibrated channel response for the downlink.

Pre-calibration may be performed for the access point to obtain matrices $\underline{T}_{ap}$ and $\underline{R}_{ap}$. Pre-calibration may also be performed for the user terminal to obtain matrices $\underline{T}_{ut}$ and $\underline{R}_{ut}$. Correction matrices $\underline{K}_{aptx}$ and $\underline{K}_{uttx}$ for the access point and user terminal, respectively, may then be derived as:

$$\begin{aligned}\tilde{\underline{K}}_{aptx} &= \tilde{\underline{T}}_{ap}^{-1}\tilde{\underline{R}}_{ap} \\ &= (r_{ap,11} \cdot \underline{T}_{ap})^{-1}(t_{ap,11} \cdot \underline{R}_{ap}) \\ &= \frac{t_{ap,11}}{r_{ap,11}} \cdot \underline{T}_{ap}^{-1}\underline{R}_{ap} \\ &= k_{aptx} \cdot \underline{K}_{aptx},\end{aligned} \qquad \text{Eq (23)}$$

and $$\begin{aligned}\tilde{\underline{K}}_{uttx} &= \tilde{\underline{T}}_{ut}^{-1}\tilde{\underline{R}}_{ut} \\ &= (r_{ut,11} \cdot \underline{T}_{ut})^{-1}(t_{ut,11} \cdot \underline{R}_{ut}) \\ &= \frac{t_{ut,11}}{r_{ut,11}} \cdot \underline{T}_{ut}^{-1}\underline{R}_{ut} \\ &= k_{uttx} \cdot \underline{K}_{uttx},\end{aligned} \qquad \text{Eq (24)}$$

where $k_{aptx}$ and $k_{uttx}$ are two scalars defined as $k_{aptx} = t_{ap,11}/r_{ap,11}$ and $k_{uttx} = t_{ut,11}/r_{ut,11}$.

Figure 6:
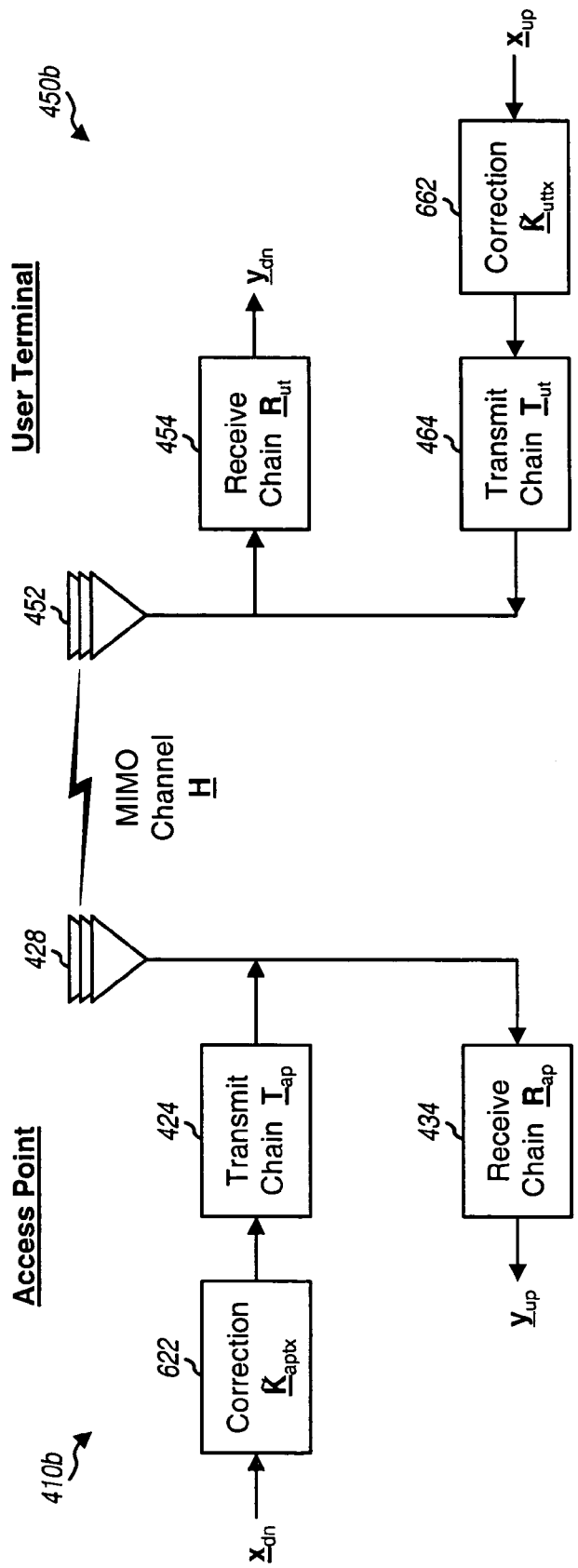
FIG. 6 shows the use of correction matrices on the transmit paths.

FIG. 6 shows the use of correction matrices on the transmit paths to account for the responses of the transmit and receive chains at an access point 410b and a user terminal 450b. On the downlink, at access point 410b, the transmit vector $\underline{x}_{dn}$ is first multiplied with the correction matrix $\tilde{\underline{K}}_{aptx}$ by a unit 622, processed by transmit chain 424, and transmitted from $N_{ap}$ antennas 428. At user terminal 450b, the $N_{ap}$ downlink signals are received by $N_{ut}$ antennas 452 and processed by receive chain 454 to obtain the received vector $\underline{y}_{dn}$.

On the uplink, at user terminal 450b, the transmit vector $\underline{x}_{up}$ is first multiplied with the correction matrix $\tilde{\underline{K}}_{uttx}$ by a unit 662, processed by transmit chain 464, and transmitted from $N_{ut}$ antennas 452. At access point 410b, the $N_{ut}$ uplink signals are received by $N_{ap}$ antennas 428 and processed by receive chain 434 to obtain the received vector $\underline{y}_{up}$.

The received vectors for the downlink and uplink, with the correction matrices $\tilde{\underline{K}}_{aptx}$ and $\tilde{\underline{K}}_{uttx}$ applied on the transmit path at the access point and user terminal, respectively, may be expressed as:

$$\underline{y}_{dn} = \underline{R}_{ut}\underline{H}\underline{T}_{ap}\tilde{\underline{K}}_{aptx}\underline{x}_{dn} = k_{aptx}\underline{R}_{ut}\underline{H}\underline{T}_{ap}\underline{T}_{ap}^{-1}\underline{R}_{ap}\underline{x}_{dn} = k_{aptx}\underline{R}_{ut}\underline{H}\underline{R}_{ap}\underline{x}_{dn}, \text{ and} \qquad \text{Eq (25)}$$

$$\underline{y}_{up} = \underline{R}_{ap}\underline{H}^T\underline{T}_{ut}\tilde{\underline{K}}_{uttx}\underline{x}_{up} = k_{uttx}\underline{R}_{ap}\underline{H}^T\underline{T}_{ut}\underline{T}_{ut}^{-1}\underline{R}_{ut}\underline{x}_{up} = k_{uttx}\underline{R}_{ap}\underline{H}^T\underline{R}_{ut}\underline{x}_{up}. \qquad \text{Eq (26)}$$

From equations (25) and (26), the calibrated downlink and uplink channel responses with the correction matrices $\tilde{\underline{K}}_{aptx}$ and $\tilde{\underline{K}}_{uttx}$ may be expressed as:

$$\tilde{\underline{H}}_{cdntx} = k_{aptx}\underline{R}_{ut}\underline{H}\underline{R}_{ap} \text{ and } \underline{H}_{cuptx} = k_{uttx}\underline{R}_{ap}\underline{H}^T\underline{R}_{ut}. \qquad \text{Eq (27)}$$

Since the scalars $k_{aptx}$ and $k_{uttx}$ do not disturb the reciprocal relationship of the downlink and uplink, $\underline{H}_{cdntx}$ is equal to a scaled version of the transpose of $\underline{H}_{cuptx}$, or $$\tilde{H}_{cuptx} = \frac{k_{uttx}}{k_{aptx}} \cdot \tilde{H}_{cdntx}^T.$$

In yet another embodiment, the responses of the transmit and receive chains at each wireless entity are accounted for by a single correction matrix applied on the receive path after the receive chain. The two equations in equation set (20) may also be combined to obtain the following:

$$\underline{H}_{dn}^T = \underline{T}_{ap}\underline{R}_{ap}^{-1}\underline{H}_{up}\underline{T}_{ut}^{-1}\underline{R}_{ut} = \underline{K}_{aprx}\underline{H}_{up}\underline{K}_{utrx}^{-1} \text{ or } \underline{H}_{dn} = (\underline{K}_{aprx}\underline{H}_{up}\underline{K}_{utrx}^{-1})^T, \qquad \text{Eq (28)}$$

where $\underline{K}_{aprx} = \underline{T}_{ap}\underline{R}_{ap}^{-1}$ and $\underline{K}_{utrx} = \underline{T}_{ut}\underline{R}_{ut}^{-1}$. Correction matrices $\underline{K}_{aprx}$ and $\underline{K}_{utrx}$ for the access point and user terminal, respectively, may be derived as:

$$\begin{aligned}\tilde{\underline{K}}_{aprx} &= \tilde{\underline{T}}_{ap}\tilde{\underline{R}}_{ap}^{-1} \\ &= (r_{ap,11} \cdot \underline{T}_{ap})(t_{ap,11} \cdot \underline{R}_{ap})^{-1} \\ &= \frac{r_{ap,11}}{t_{ap,11}} \cdot \underline{T}_{ap}\underline{R}_{ap}^{-1} \\ &= k_{aprx} \cdot \underline{K}_{aprx}, \text{ and}\end{aligned} \qquad \text{Eq (29)}$$

-continued $$\tilde{K}_{utrx} = \tilde{T}_{ut}\tilde{R}_{ut}^{-1}$$ Eq (30)
$$= (r_{ut,11} \cdot T_{ut})(t_{ut,11} \cdot R_{ut})^{-1}$$
$$= \frac{r_{ut,11}}{t_{ut,11}} \cdot T_{ut} R_{ut}^{-1}$$
$$= k_{utrx} \cdot K_{utrx},$$

where $k_{aprx}$ and $k_{utrx}$ are two scalars defined as $k_{aprx} = r_{ap,11}/t_{ap,11}$ and $k_{utrx} = r_{ut,11}/t_{ut,11}$.

Figure 7:
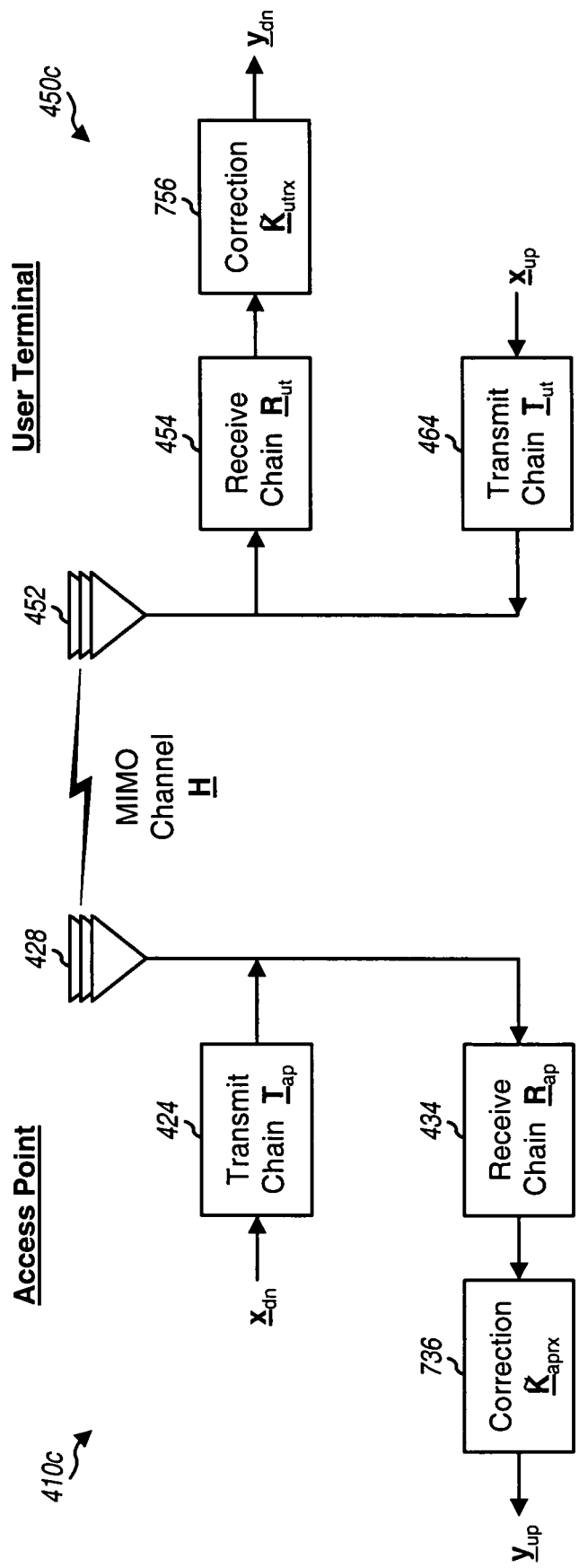
FIG. 7 shows the use of correction matrices on the receive paths.

FIG. 7 shows the use of correction matrices on the receive paths to account for the responses of the transmit and receive chains at an access point 410c and a user terminal 450c. On the downlink, at access point 410c, the transmit vector $\underline{x}_{dn}$ is processed by transmit chain 424 and transmitted from $N_{ap}$ antennas 428. At user terminal 450c, the $N_{ap}$ downlink signals are received by $N_{ut}$ antennas 452, processed by receive chain 454, and further multiplied with the correction matrix $\underline{K}_{utrx}$ by a unit 756 to obtain the received vector $\underline{y}_{dn}$.

On the uplink, at user terminal 450c, the transmit vector $\underline{x}_{up}$ is processed by transmit chain 464 and transmitted from $N_{ut}$ antennas 452. At access point 410c, the $N_{ut}$ uplink signals are received by $N_{ap}$ antennas 428, processed by receive chain 434, and further multiplied with the correction matrix $\underline{K}_{aprx}$ by a unit 736 to obtain the received vector $\underline{y}_{up}$.

The received vectors for the downlink and uplink, with the correction matrices $\underline{K}_{aprx}$ and $\underline{K}_{utrx}$ applied on the receive path at the access point and user terminal, respectively, may be expressed as:

$$\underline{y}_{dn} = \tilde{K}_{utrx}R_{ut}HT_{ap}\underline{x}_{dn} = k_{utrx}T_{ut}R_{ut}^{-1}R_{ut}HT_{ap}\underline{x}_{dn} = k_{utrx}T_{ut}HT_{ap}\underline{x}_{dn}, \text{ and}$$ Eq (31)

$$\underline{y}_{up} = \tilde{K}_{aprx}R_{ap}H^T T_{ut}\underline{x}_{up} = k_{aprx}T_{ap}R_{ap}^{-1}R_{ap}H^T T_{ut}\underline{x}_{up} = k_{aprx}T_{ap}H^T T_{ut}\underline{x}_{up}.$$ Eq (32)

From equations (31) and (32), the calibrated downlink and uplink channel responses with the correction matrices $\underline{K}_{aprx}$ and $\underline{K}_{utrx}$ may be expressed as:

$$\tilde{H}_{cdnrx} = k_{utrx}T_{ut}HT_{ap} \text{ and } \tilde{H}_{cuprx} = k_{aprx}T_{ap}H^T T_{ut}.$$ Eq (33)

Again, the scalars $k_{aprx}$ and $k_{utrx}$ do not disturb the reciprocal relationship of the downlink and uplink, and $\tilde{H}_{cdnrx}$ is equal to a scaled version of the transpose of $\tilde{H}_{cuprx}$, or $$\tilde{H}_{cuprx} = \frac{k_{aprx}}{k_{utrx}} \cdot \tilde{H}_{cdnrx}^T.$$

As shown in FIGS. 5 through 7, the responses of the transmit and receive chains at the access point and user terminal may be accounted for with a correction matrix for each chain (as shown in FIG. 5), a correction matrix for the transmit path (as shown in FIG. 6), or a correction matrix for the receive path (as shown in FIG. 7). The embodiment shown in FIG. 5 may be used for both TDD and FDD MIMO systems. The embodiments shown in FIGS. 6 and 7 are typically used for a TDD MIMO system. For the TDD MIMO system, the use of the correction matrices allows the calibrated channel response for one link to be expressed by the calibrated channel response for the other link, which can simplify both channel estimation and spatial processing for data transmission over the MIMO channel.

The pre-calibration techniques may be used for a single-carrier MIMO system, as described above. These techniques may also be used for a multi-carrier MIMO system, which may utilize orthogonal frequency division multiplexing (OFDM) or some other multi-carrier modulation technique. OFDM effectively partitions the overall system bandwidth into multiple ($N_F$) orthogonal subbands, which are also called tones, subcarriers, bins, and frequency channels. With OFDM, each subband is associated with a respective subcarrier that may be modulated with data. For a MIMO system that utilizes OFDM (a MIMO-OFDM system), the pre-calibration described above may be performed for each of multiple subbands (e.g., for each subband used for transmission).

The pre-calibration may also be performed for different operating points. The transmit and/or receive chains may have variable gains, and different responses may be obtained for the transmit/receive chains at different gain settings. The pre-calibration may be performed to obtain different correction matrices for different gain settings. The appropriate correction matrices would then be used based on the gain settings for these chains. In general, pre-calibration may be performed for one or multiple values of a given parameter (e.g., gain, temperature, and so on) to obtain correction matrices that can account for the responses of the transmit/receive chains at each parameter value.

2. Field Calibration

Field calibration may be performed to determine and account for the responses of the transmit/receive chains at the access point and user terminal. For field calibration, the access point transmits a MIMO pilot on the downlink, and the user terminal transmits a MIMO pilot on the uplink. A MIMO pilot is a pilot comprised of $N_T$ pilot transmissions sent from $N_T$ transmit antennas, where the pilot transmission from each transmit antenna is identifiable by the receiving entity. This may be achieved, for example, by using a different orthogonal sequence for the pilot transmission from each transmit antenna. The access point obtains the effective uplink channel response $\underline{H}_{up}$ based on the uplink MIMO pilot. The user terminal obtains the effective downlink channel response $\underline{H}_{dn}$ based on the downlink MIMO pilot. One entity (e.g., the access point) then sends to the other entity (e.g., the user terminal) its effective channel response. Correction matrices for both the access point and the user terminal may be computed from $\underline{H}_{dn}$ and $\underline{H}_{up}$ using, for example, matrix-ratio computation or minimum mean square error (MMSE) computation.

For the matrix-ratio computation to derive $\underline{K}_{aptx}$ and $\underline{K}_{uttx}$ for the transmit paths, an $N_{ut} \times N_{ap}$ matrix $\underline{C}$ is first computed as:

$$\underline{C} = \frac{H_{up}^T}{H_{dn}},$$ Eq (34)

where the ratio is taken element-by-element.

The diagonal elements of $\underline{K}_{aptx}$ are set equal to the mean of the normalized rows of $\underline{C}$. Each row of $\underline{C}$ is first normalized by scaling each of the $N_{ap}$ elements in that row with the first element in the row. The mean of the normalized rows (denoted by a vector $\bar{c}_{row}$) is then computed as the sum of the $N_{ut}$ normalized rows divided by $N_{ut}$. The $N_{ap}$ diagonal elements of $\underline{K}_{aptx}$ are set equal to the $N_{ap}$ elements of $\bar{c}_{row}$. Because of the normalization, the lead element of $\underline{K}_{aptx}$ is equal to unity.

The diagonal elements of $\underline{K}_{uttx}$ are set equal to the mean of the inverses of the normalized columns of $\underline{C}$. The j-th column of $\underline{C}$, for $j=1 \ldots N_{ap}$, is first normalized by scaling each element in that column with the j-th diagonal element of $\underline{K}_{aptx}$. The mean of the inverses of the normalized columns (denoted by a vector $\bar{c}_{col}$) is then computed by (1) taking the inverse of each normalized column, where the inversion is performed element-wise, (2) summing the $N_{ap}$ inverse normalized columns, and (3) dividing each element in the resultant column by $N_{ap}$ to obtain $\bar{c}_{col}$. The $N_{ut}$ diagonal elements of $\underline{K}_{uttx}$ are set equal to the $N_{ut}$ elements of $\bar{c}_{col}$.

For the MMSE computation, the correction matrices $\underline{K}_{aptx}$ and $\underline{K}_{uttx}$ for the transmit paths are derived from $\underline{H}_{dn}$ and $\underline{H}_{up}$ such that the mean square error (MSE) between the calibrated downlink and uplink channel responses is minimized. This condition may be expressed as:

$$\min |(\underline{H}_{dn}\underline{K}_{aptx})^T - \underline{H}_{up}\underline{K}_{uttx}|^2 \text{ or } \min|\underline{K}_{aptx}\underline{H}_{dn}^T - \underline{H}_{up}\underline{K}_{uttx}|^2, \qquad \text{Eq (35)}$$

where $\underline{K}_{aptx}^T = \underline{K}_{aptx}$ since $\underline{K}_{aptx}$ is a diagonal matrix. For equation (35), the lead element in the first row of the first column of $\underline{K}_{aptx}$ is set equal to unity so that the trivial solution, with all elements of $\underline{K}_{aptx}$ and $\underline{K}_{uttx}$ set equal to zero, is not obtained.

To obtain $\underline{K}_{aptx}$ and $\underline{K}_{uttx}$ based on equation (35), the mean square error (or the square error since a divide by $N_{ap}N_{ut}$ is omitted) may be computed as:

$$MSE = \sum_{j=1}^{N_{ut}} \sum_{i=1}^{N_{ap}} |h_{dn,ji} \cdot k_{ap,i} - h_{up,ij} \cdot k_{ut,j}|^2, \qquad \text{Eq (36)}$$

where
$h_{dn,ji}$ is the element in the j-th row and i-th column of $\underline{H}_{dn}$;
$h_{up,ij}$ is the element in the i-th row and j-th column of $\underline{H}_{up}$;
$k_{ap,i}$ is the i-th diagonal element of $\underline{K}_{aptx}$, where $k_{ap,1}=1$; and
$k_{ut,j}$ is the j-th diagonal element of $\underline{K}_{uttx}$.

The minimum mean square error may be obtained by taking the partial derivatives of equation (36) with respect to $k_{ap,i}$ and $k_{ut,j}$ and setting the partial derivatives to zero. The results of these operations are the following equations:

$$\sum_{j=1}^{N_{ut}} (h_{dn,ji} \cdot k_{ap,i} - h_{up,ij} \cdot k_{ut,j}) \cdot h_{dn,ji}^* = 0, \text{ for } i=2\ldots N_{ap}, \text{ and} \qquad \text{Eq (37a)}$$

$$\sum_{i=1}^{N_{ap}} (h_{dn,ji} \cdot k_{ap,i} - h_{up,ij} \cdot k_{ut,j}) \cdot h_{up,ij}^* = 0, \text{ for } j=1\ldots N_{ut}. \qquad \text{Eq (37b)}$$

In equation (37a), $k_{ap,1}=1$ so there is no partial derivative for this case, and index i runs from 2 through $N_{ap}$. The $N_{ap}+N_{ut}-1$ equations in equation sets (37a) and (37b) may be solved (e.g., using matrix operations) to obtain $k_{ap,i}$ and $k_{ut,j}$, which are the elements of $\underline{K}_{aptx}$ and $\underline{K}_{uttx}$ that minimize the mean square error in the calibrated downlink and uplink channel responses.

3. Follow-On Calibration

The correction matrices obtained from the pre-calibration and/or field calibration may contain errors due to various sources such as (1) noise in the measurements for the pre-calibration, (2) imperfect channel estimates used for the field calibration, (3) changes in the transmit/receive chains at the access point and user terminal, and so on. Errors in the correction matrices cause errors in the transmissions sent and received using these matrices. Follow-on calibration may be performed to estimate and remove the errors in the correction matrices.

The channel response matrix $\underline{H}$ may be "diagonalized" to obtain $N_S$ eigenmodes of the MIMO channel, which may be viewed as orthogonal spatial channels. This diagonalization may be achieved by performing singular value decomposition of $\underline{H}$. Table 1 shows (1) the effective and calibrated channel responses for the downlink and uplink for a reciprocal channel and (2) the singular value decomposition of the calibrated downlink and uplink channel response matrices.

TABLE 1

| | Singular Value Decomposition | |
|---|---|---|
| | Downlink | Uplink |
| Effective Channel Response | $\underline{H}_{dn} = \underline{R}_{ut}\underline{H}\underline{T}_{ap}$ | $\underline{H}_{up} = \underline{R}_{ap}\underline{H}^T\underline{T}_{ut}$ |
| Calibrated Channel Response | $\underline{H}_{cdn} = \underline{H}_{dn}\underline{K}_{ap}$ | $\underline{H}_{cup} = \underline{H}_{up}\underline{K}_{ut}$ |
| Singular Value Decomposition | $\underline{H}_{cdn} = \underline{V}_{ut}^* \underline{\Sigma}^T \underline{U}_{ap}^T$ | $\underline{H}_{cup} = \underline{U}_{ap} \underline{\Sigma} \underline{V}_{ut}^T$ |
| Unnormalized Transmit Matrices | $\underline{V}_{ut}\underline{\Sigma}^T = \underline{H}_{cdn}\underline{U}_{ap}$ | $\underline{U}_{ap}\underline{\Sigma} = \underline{H}_{cup}\underline{V}_{ut}$ |

In Table 1, $\underline{U}_{ap}$ is an $N_{ap} \times N_{ap}$ unitary matrix of left eigenvectors of $\underline{H}_{cup}$, $\underline{\Sigma}$ is an $N_{ap} \times N_{ut}$ diagonal matrix of singular values of $\underline{H}_{cup}$, $\underline{V}_{ut}$ is an $N_{ut} \times N_{ut}$ unitary matrix of right eigenvectors of $\underline{H}_{cup}$, and "*" denotes the complex conjugate. A unitary matrix $\underline{M}$ is characterized by the property $\underline{M}^H\underline{M}=\underline{I}$, where $\underline{I}$ is the identity matrix. Because of the reciprocal channel, the matrices $\underline{V}_{ut}^*$ and $\underline{U}_{ap}^*$ are also matrices of left and right eigenvectors, respectively, of $\underline{H}_{cdn}$. The matrices $\underline{U}_{ap}$ and $\underline{V}_{ut}$ (which are also called transmit matrices) may be used by the access point and user terminal, respectively, for spatial processing and are denoted as such by their subscripts. Singular value decomposition is described in further detail by Gilbert Strang in a book entitled "Linear Algebra and Its Applications," Second Edition, Academic Press, 1980.

For a reciprocal channel, the singular value decomposition may be performed by one wireless entity to obtain both matrices $\underline{U}_{ap}$ and $\underline{V}_{ut}$. For example, the user terminal may obtain the calibrated downlink channel response $\underline{H}_{cdn}$, perform decomposition of $\underline{H}_{cdn}^T$, use $\underline{V}_{ut}$ for spatial processing, and send $\underline{U}_{ap}$ back to the access point via a steered reference. A steered reference (or steered pilot) is a pilot transmitted from all antennas and on the eigenmodes of the MIMO channel. For clarity, the following description assumes the correction matrices being applied on the transmit paths.

The user terminal may transmit an uplink steered reference, as follows:

$$\underline{x}_{up,m} = \underline{K}_{uttx}\underline{v}_{ut,m}p_m, \qquad \text{Eq (38)}$$

where
$p_m$ is a pilot symbol transmitted on eigenmode m for the steered reference;
$\underline{x}_{up,m}$ is a transmit vector for the uplink steered reference for eigenmode m; and
$\underline{v}_{ut,m}$ is the m-th eigenvector or column of $\underline{V}_{ut}$, where $\underline{V}_{ut}=[\underline{v}_{ut,1}\ \underline{v}_{ut,2}\ \cdots\ \underline{v}_{ut,N_{ut}}]$.

The received uplink steered reference at the access point may be expressed as:

$$\underline{y}_{up,m} = \underline{H}_{up}\underline{x}_{up,m} = \underline{H}_{up}\underline{K}_{uttx}\underline{v}_{ut,m}p_m = \underline{H}_{cup}\underline{v}_{ut,m}p_m = \underline{U}_{ap}\underline{\Sigma}\underline{V}_{ut}^H\underline{v}_{ut,m}p_m = \underline{u}_{ap,m}\sigma_m p_m, \qquad \text{Eq (39)}$$

where $\underline{y}_{up,m}$ is a received vector for the uplink steered reference for eigenmode m;

$\sigma_m$ is the m-th diagonal element of $\underline{\Sigma}$; and $\underline{u}_{ap,m}$ is the m-th eigenvector or column of $\underline{U}_{ap}$, where $\underline{U}_{ap} = [\underline{u}_{ap,1} \; \underline{u}_{ap,2} \; \ldots \; \underline{u}_{ap,N_{ap}}]$.

Equation (39) shows that the received uplink steered reference at the access point, in the absence of noise, is equal to $\underline{u}_{ap,m}\sigma_m p_m$. The access point may thus obtain the eigenvectors $\underline{u}_{ap,m}$, for $m = 1 \ldots N_S$, based on the uplink steered reference sent by the user terminal. Since the $N_S$ eigenvectors are obtained one at a time and because of noise, these $N_S$ eigenvectors may not be orthogonal to one another. The access point may perform QR factorization (e.g., using a Gram-Schmidt procedure) on the $N_S$ eigenvectors to obtain orthogonal eigenvectors. In any case, the access point obtains the transmit matrix $\underline{U}_{ap}$ and uses it for spatial processing for downlink transmission.

Table 2 summarizes the spatial processing performed by the user terminal and access point for data transmission and reception on the eigenmodes of the MIMO channel.

TABLE 2

| | Uplink | Downlink |
|---|---|---|
| User Terminal | Transmit: $\underline{x}_{up} = \underline{K}_{uttx} \underline{V}_{ut} \underline{s}_{up}$ | Receive: $\hat{\underline{s}}_{dn} = \underline{\Sigma}^{-1} \underline{V}_{ut}^T \underline{y}_{dn}$ |
| Access Point | Receive: $\hat{\underline{s}}_{up} = \underline{\Sigma}^{-1} \underline{U}_{ap}^H \underline{y}_{up}$ | Transmit: $\underline{x}_{dn} = \underline{K}_{aptx} \underline{U}_{ap}^* \underline{s}_{dn}$ |

In Table 2, $\underline{s}_{dn}$ is a vector of data symbols for the downlink, $\hat{\underline{s}}_{dn}$ is a vector of detected symbols for the downlink, $\underline{s}_{up}$ is a vector of data symbols for the uplink, and $\hat{\underline{s}}_{up}$ is a vector of detected symbols for the uplink, where $\hat{\underline{s}}_{dn}$ and $\hat{\underline{s}}_{up}$ are estimates of $\underline{s}_{dn}$ and $\underline{s}_{up}$, respectively. A "detected symbol" is an estimate of a data symbol.

The access point and user terminal may use correction matrices $\hat{\underline{K}}_{aptx}$ and $\hat{\underline{K}}_{uttx}$, respectively, which have errors from the ideal correction matrices $\underline{K}_{aptx}$ and $\underline{K}_{uttx}$. The errors in $\hat{\underline{K}}_{aptx}$ and $\hat{\underline{K}}_{uttx}$ may be represented by diagonal calibration error matrices $\underline{Q}'_{ap}$ and $\underline{Q}'_{ut}$, respectively. The matrices $\hat{\underline{K}}_{aptx}$ and $\hat{\underline{K}}_{uttx}$ may then be expressed as:

$$\hat{\underline{K}}_{aptx} = \underline{K}_{aptx} \underline{Q}'_{ap} \text{ and } \hat{\underline{K}}_{uttx} = \underline{K}_{uttx} \underline{Q}'_{ut}. \quad \text{Eq (40)}$$

If the access point transmits a MIMO pilot with $\hat{\underline{K}}_{aptx}$, then the calibrated downlink response $\hat{\underline{H}}_{cdn}$ obtained by the user terminal may be expressed as:

$$\hat{\underline{H}}_{cdn} = \underline{H}_{dn}\hat{\underline{K}}_{aptx} = \underline{H}_{dn}\underline{K}_{aptx}\underline{Q}'_{ap} = \underline{H}_{cdn}\underline{Q}'_{ap}, \quad \text{Eq (41)}$$

or $\underline{H}_{cdn} = \hat{\underline{H}}_{cdn}\underline{Q}'^{-1}_{ap}$, where $\hat{\underline{H}}_{cdn}$ contains error due to the fact that $\hat{\underline{K}}_{aptx}$ contains error. The singular value decomposition of $\hat{\underline{H}}_{cnd}^T$ may be expressed as: $\hat{\underline{H}}_{cdn}^T = \hat{\underline{U}}_{ap}\hat{\underline{\Sigma}}\hat{\underline{V}}_{ut}^H$, where $\hat{\underline{U}}_{ap}$ and $\hat{\underline{V}}_{ut}$ are estimates of $\underline{U}_{ap}$ and $\underline{V}_{ut}$, respectively, due to errors in $\hat{\underline{K}}_{aptx}$.

For clarity, a specific embodiment of the follow-on calibration is described below. For this embodiment, the access point transmits a MIMO pilot on the downlink using $\hat{\underline{K}}_{aptx}$ and also transmits a steered reference on the downlink using $\hat{\underline{K}}_{aptx}$ and $\hat{\underline{U}}_{ap}$. The downlink steered reference may be expressed as: $\underline{x}_{dn,m} = \hat{\underline{K}}_{aptx}\hat{\underline{u}}_{ap,m}p_m$, where $\hat{\underline{U}}_{ap} = [\hat{\underline{u}}_{ap,1} \; \hat{\underline{u}}_{ap,2} \; \ldots \; \hat{\underline{u}}_{ap,N_{ap}}]$. The user terminal can obtain $\hat{\underline{V}}_{ut}\hat{\underline{\Sigma}}^T$ (which is called an unnormalized transmit matrix $\underline{V}_a$) based on the downlink steered reference.

The matrices $\underline{Q}'_{ap}$ and $\underline{Q}'_{ut}$ contain "true" errors in $\hat{\underline{K}}_{aptx}$ and $\hat{\underline{K}}_{uttx}$, respectively. A guess of $\underline{Q}'_{ap}$ and $\underline{Q}'_{ut}$ may be denoted as $\underline{Q}_{ap}$ and $\underline{Q}_{ut}$, respectively. A "hypothesized" downlink channel may be defined as:

$$\underline{H}_{hyp} = \hat{\underline{H}}_{cdn}\underline{Q}_{ap}^{-1}. \quad \text{Eq (42)}$$

The hypothesized downlink channel is a guess of $\underline{H}_{cdn}$ and is derived under the assumption that the errors in $\hat{\underline{K}}_{aptx}$ is $\underline{Q}_{ap}$.

If the user terminal transmits an uplink steered reference using $\hat{\underline{V}}_{ut}$ (which is derived from $\hat{\underline{H}}_{cdn}$ obtained from the downlink MIMO pilot) and $\hat{\underline{K}}_{uttx}$, then the transmit matrix $\hat{\underline{U}}_{ap}$ obtained by the access point may be expressed as:

$$\hat{\underline{U}}_{ap}\hat{\underline{\Sigma}} = \hat{\underline{H}}_{cup}\hat{\underline{V}}_{ut} = \underline{H}_{up}\hat{\underline{K}}_{uttx}\hat{\underline{V}}_{ut} = \underline{H}_{up}\underline{K}_{uttx}\underline{Q}'_{ut}\hat{\underline{V}}_{ut} = \underline{H}_{cup} \underline{Q}'_{ut}\hat{\underline{V}}_{ut} \quad \text{Eq (43)}$$

However, the user terminal does not have $\underline{Q}'_{ap}$ and $\underline{Q}'_{ut}$, but only their guesses $\underline{Q}_{ap}$ and $\underline{Q}_{ut}$. The user terminal thus computes an unnormalized transmit matrix $\tilde{\underline{U}}_{rx}$ that hypothetically would have been obtained by the access point if the errors were $\underline{Q}_{ap}$ and $\underline{Q}_{ut}$, as follows:

$$\tilde{\underline{U}}_{rx} = \underline{H}_{hyp}^T \underline{Q}_{ut}\hat{\underline{V}}_{ut} = (\hat{\underline{H}}_{cdn}\underline{Q}_{ap}^{-1})^T \underline{Q}_{ut}\hat{\underline{V}}_{ut}. \quad \text{Eq (44)}$$

Equation (44) is equal to equation (43) if $\underline{Q}_{ap}$ is a perfect guess of $\underline{Q}'_{ap}$ (in which case $\underline{H}_{hyp}^T = \underline{H}_{cup} = \underline{H}_{cdn}^T$) and $\underline{Q}_{ut}$ is a perfect guess of $\underline{Q}'_{ut}$.

The user terminal then performs processing on $\tilde{\underline{U}}_{rx}$ in the same manner that the access point would have performed on a received uplink steered reference (e.g., QR factorization) and obtains a transmit matrix $\underline{U}_g$, which is a normalized transmit matrix that resembles $\hat{\underline{U}}_{ap}$. The user terminal emulates the processing performed by both the access point and user terminal for normal operation, albeit under an assumption of calibration errors represented by $\underline{Q}_{ap}$ and $\underline{Q}_{ut}$. The matrix $\underline{U}_g$ would have been used by the access point to transmit the downlink steered reference.

If the access point transmits a downlink steered reference using $\underline{U}_g$ and $\hat{\underline{K}}_{aptx}$, then the transmit vector $\underline{V}_g$ obtained by the user terminal may be expressed as:

$$\underline{V}_g\underline{\Sigma}_g^T = \hat{\underline{H}}_{cdn}\underline{U}_g = \underline{H}_{dn}\hat{\underline{K}}_{aptx}\underline{U}_g = \underline{H}_{dn}\underline{K}_{aptx}\underline{Q}'_{ap}\underline{U}_g = \underline{H}_{cdn}\underline{Q}'_{ap}\underline{U}_g. \quad \text{Eq (45)}$$

Again, the user terminal does not have $\underline{Q}'_{ap}$ and $\underline{Q}'_{ut}$, but only their guesses $\underline{Q}_{ap}$ and $\underline{Q}_{ut}$. The user terminal thus computes a hypothesized transmit matrix $\underline{V}_{hyp}$ as follows:

$$\tilde{\underline{V}}_{hyp} = \underline{H}_{hyp}\underline{Q}_{ap}\underline{U}_g. \quad \text{Eq (46)}$$

Equation (46) is equal to equation (45) if $\underline{Q}_{ap}$ is a perfect guess of $\underline{Q}'_{ap}$ (in which case $\underline{H}_{hyp} = \underline{H}_{cdn}$). The unnormalized transmit matrix $\underline{V}_{hyp}$ includes a user terminal transmit matrix $\underline{V}_g$ (which corresponds to $\underline{U}_g$) as well as a diagonal matrix $\underline{\Sigma}_g$ (which resembles $\underline{\Sigma}$). The matrix $\underline{V}_{hyp}$ is hypothesized to have been received by the user terminal with (1) the user terminal transmitting an uplink steered reference using $\hat{\underline{V}}_{ut}$ and $\hat{\underline{K}}_{uttx}$, (2) the access point performing its normal processing on the received uplink steered reference to derive its transmit matrix $\underline{U}_g$ and $\hat{\underline{K}}_{aptx}$, (3) the access point transmitting a downlink steered reference using $\underline{U}_g$, and (4) the correction matrices $\hat{\underline{K}}_{aptx}$ and $\hat{\underline{K}}_{uttx}$ having the errors indicated by the matrices $\underline{Q}_{ap}$ and $\underline{Q}_{ut}$, respectively.

Equations (44) and (46) are correct if $Q_{ap}$ and $Q_{ut}$ indicate the true errors in $\hat{K}_{aptx}$ and $\hat{K}_{uttx}$, respectively. The difference between $\underline{V}_a$ obtained from the downlink steered reference and $\underline{V}_{hyp}$ obtained from the downlink MIMO pilot may be computed as:

$$\underline{E} = \underline{V}_a - \underline{V}_{hyp}, \qquad \text{Eq (47)}$$

where $\underline{E}$ is an $N_{ut} \times N_{ap}$ matrix of errors between $\underline{V}_a$ and $\underline{V}_{hyp}$. The error matrix $\underline{E}$ gives an indication of the accuracy of the guesses for $Q_{ap}$ and $Q_{ut}$. An adaptive procedure (e.g., an MMSE adaptive procedure or a steepest descent adaptive procedure) may be used to adjust $Q_{ap}$ and $Q_{ut}$ to drive $\underline{E}$ toward zero.

For the MMSE adaptive procedure, approximate partial derivatives of the elements of $\underline{E}$ are computed with respect to the elements of $Q_{ap}$ and $Q_{ut}$. To facilitate the computation, the real and imaginary components of the diagonal elements of $Q_{ap}$ and $Q_{ut}$ (except for the lead elements, which are set to 1.0) may be stored in a real vector $\underline{q}$ of length $2(N_{ap}+N_{ut}-2)$. Similarly, the real and imaginary components of $\underline{E}$ may be stored in a real vector $\underline{e}$ of length $2N_{ap}N_{ut}$. Approximate partial derivatives of the elements of $\underline{e}$ with respect to the elements of $\underline{q}$ may be expressed as:

$$A_{j,i} = \frac{\partial e_j}{\partial q_i} \cong \frac{e_j(\underline{q}+\underline{\Delta}_i) - e_j(\underline{q})}{\delta}, \quad \begin{array}{l} \text{for } i = 1\ldots 2(N_{ap}+N_{ut}-2) \\ \text{and } j = 1\ldots 2N_{ap}N_{ut} \end{array} \qquad \text{Eq (48)}$$

where $\underline{\Delta}_j$ is a vector of length $2(N_{ap}+N_{ut}-2)$ and containing a small real value of $\delta$ for the j-th element and zeros elsewhere; and $A_{j,i}$ is the approximate partial derivative of the j-th element of $\underline{e}$ with respect to the i-th element of $\underline{q}$.

The approximate partial derivative $A_{j,i}$ may be obtained as follows. A vector $\underline{q}_i$ is first computed as $\underline{q}_i = \underline{q} + \underline{\Delta}_i$. The function defined by equations (42), (44), and (46) is then evaluated for $\underline{q}_i$ (which contains $Q_{ap,i}$ and $Q_{ut,i}$) to obtain a new hypothesized transmit matrix $\underline{V}_{hyp,i}$. $\underline{V}_{hyp,i}$ is then subtracted from $\underline{V}_a$ to obtain a new error matrix $\underline{E}_i = \underline{V}_a - \underline{V}_{hyp,i}$, which is used to form a new error vector $\underline{e}_i$. The j-th element of $\underline{e}$, which is denoted as $e_j(\underline{q})$ in equation (48), is then subtracted from the j-th element of $\underline{e}_i$, which is denoted as $e_j(\underline{q}+\underline{\Delta}_i)$ in equation (48). The result of the subtraction is divided by $\delta$ to obtain $A_{j,i}$.

If the relationships in equations (42), (44), (46), and (47) are approximately linear, then an estimate of the difference between the guess of the calibration errors in $\underline{q}$ and the actual calibration errors may be expressed as:

$$\underline{b} = \underline{A}^{-1}\underline{e}, \qquad \text{Eq (49)}$$

where $\underline{A}$ is a matrix of approximate partial derivatives $A_{j,i}$ obtained from equation (48) and $\underline{b}$ is an update vector. The calibration error vector may then be updated as follows:

$$\underline{q}(n+1) = \underline{b}(n) + \underline{q}(n), \qquad \text{Eq (50)}$$

where $\underline{q}(n)$ and $\underline{q}(n+1)$ are the calibration error vectors for the n-th and (n+1)-th iterations, respectively, and $\underline{y}(n)$ is the update vector for the n-th iteration.

The computation described above may be repeated for a number of iterations. Each iteration uses the updated calibration error vector $\underline{q}(n+1)$ obtained from the prior iteration. The procedure can terminate when the update vector $\underline{b}(n)$ is sufficiently small, e.g., if $\|\underline{b}(n)\|^2 < y_{th1}$, where $\|\underline{b}(n)\|^2$ is the sum of the squares of the magnitude of the elements of $\underline{b}(n)$ and $y_{th1}$ is a threshold value. After all iterations have been completed, the matrices for the final estimates of the calibration errors are denoted as $Q_{ap,final}$ and $Q_{ut,final}$. The correction matrix for the user terminal may be updated to account for the calibration errors, as follows:

$$\hat{\underline{K}}_{uttx,new} = \hat{\underline{K}}_{uttx} Q_{ut,final}^{-1}. \qquad \text{Eq (51)}$$

The user terminal thereafter uses $\hat{\underline{K}}_{uttx,new}$ for spatial processing for uplink transmission, as shown in FIG. 6. The user terminal may send $Q_{ap,final}$ to the access point, which may then update its correction matrix as $\hat{\underline{K}}_{aptx,new} = \hat{\underline{K}}_{aptx} Q_{ap,final}^{-1}$.

4. System

Figure 8:
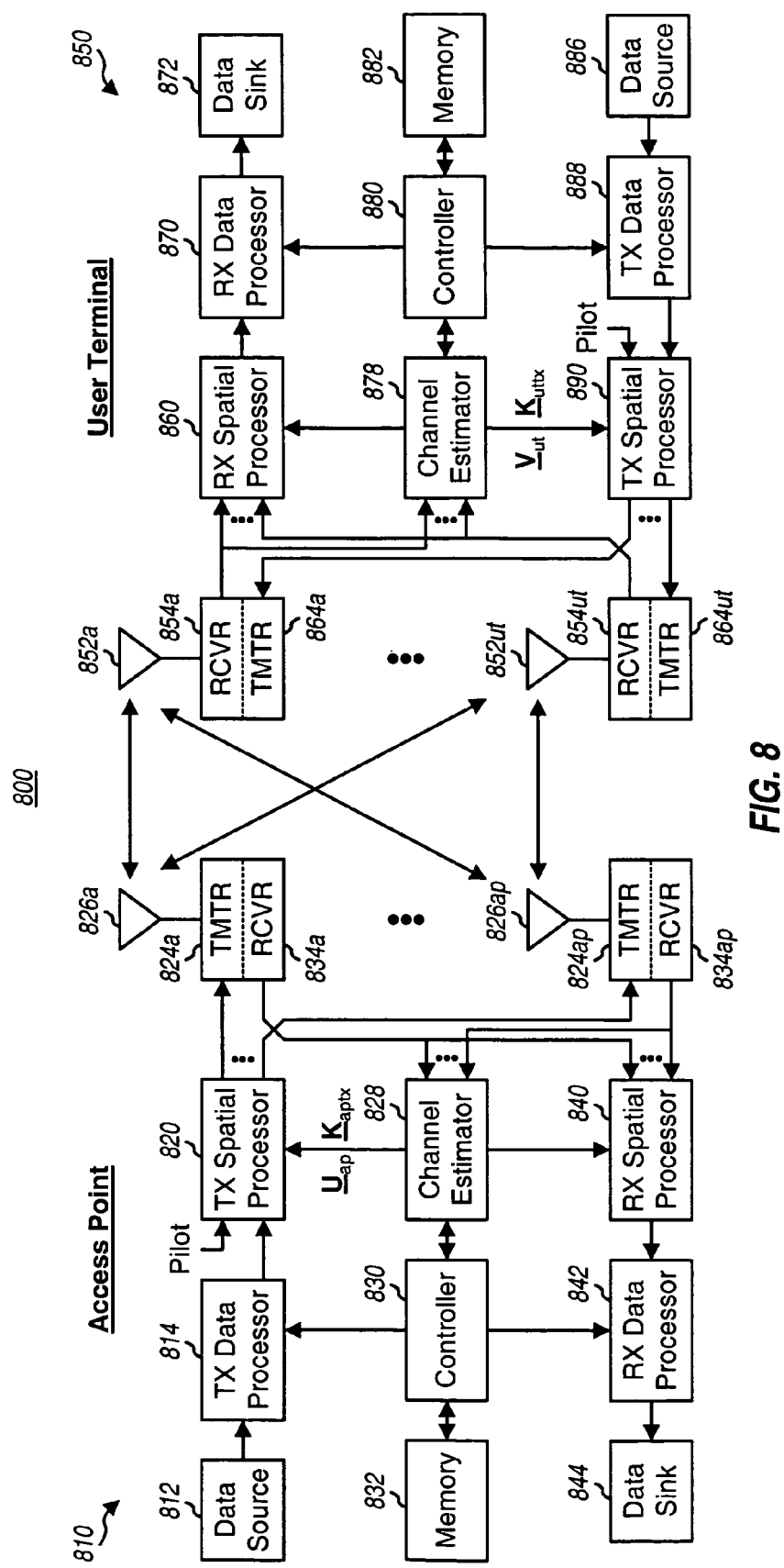
FIG. 8 shows a block diagram of the access point and the user terminal.

FIG. 8 shows a block diagram of an access point 810 and a user terminal 850 in a MIMO system 800. On the downlink, at access point 810, a TX data processor 814 receives traffic data from a data source 812 and signaling and other data from a controller 830. TX data processor 814 formats, encodes, interleaves, and modulates (or symbol maps) the different types of data and provides data symbols. A TX spatial processor 820 performs spatial processing on the data symbols from TX data processor 814, multiplexes in pilot symbols as appropriate (e.g., for channel estimation, calibration, and so on), performs scaling with a correction matrix (if applicable), and provides $N_{ap}$ streams of transmit symbols to $N_{ap}$ transmitter units 824a through 824ap. Each transmitter unit 824 conditions a respective transmit symbol stream to generate a corresponding downlink signal. $N_{ap}$ downlink signals from transmitter units 824a through 824ap are then transmitted from $N_{ap}$ antennas 826a through 826ap, respectively.

At user terminal 850, $N_{ut}$ antennas 852a through 852ut receive the downlink signals, and each antenna provides a received signal to a respective receiver unit 854. Each receiver unit 854 performs processing complementary to that performed at transmitter units 824 and provides received symbols. An RX spatial processor 860 may perform scaling with a correction matrix (if applicable) and further performs receiver spatial processing on the received symbols from all $N_{ut}$ receiver units 854 to obtain detected symbols, which are estimates of the data symbols sent by the access point. An RX data processor 870 demodulates (or symbol demaps), deinterleaves, and decodes the detected symbols and provides decoded data to a data sink 872 for storage and/or a controller 880 for further processing.

The processing for the uplink may be the same or different from the processing for the downlink. Data and signaling are encoded, interleaved, and modulated by a TX data processor 888, and further spatially processed, multiplexed with pilot symbols, and scaled with a correction matrix (if applicable) by TX spatial processor 890 to obtain transmit symbols. The transmit symbols are further processed by transmitter units 864a through 864ut to obtain $N_{ut}$ uplink signals, which are then transmitted via $N_{ut}$ antennas 852a through 852ut to the access point. At access point 810, the uplink signals are received by antennas 826, conditioned by receiver units 834, and processed by an RX spatial processor 840 and an RX data processor 842 in a manner complementary to that performed at the user terminal.

Controllers 830 and 880 control the operation of various processing units at the access point and user terminal, respectively. Controllers 830 and/or 880 may also perform processing for pre-calibration, field calibration, and/or follow-on calibration. Memory units 832 and 882 store data and program codes used by controllers 830 and 880, respectively.

Channel estimators 828 and 878 estimate the channel response based on pilots received on the uplink and downlink, respectively.

For pre-calibration at user terminal 850, test signals may be sent by TX spatial processor 890 and measured by RX spatial processor 860 to determine overall gains for different combinations of transmitter and receiver units at the user terminal, as described above. Controller 880 may (1) obtain matrices $\underline{T}_{ut}$ and $\underline{R}_{ut}$ of gains for the transmitter and receiver units and (2) derive one or more correction matrices for the user terminal based on $\underline{T}_{ut}$ and $\underline{R}_{ut}$. For field calibration, controller 880 may obtain the effective downlink and uplink channel responses $\underline{H}_{up}$ and $\underline{H}_{dn}$ and may derive correction matrices for both the user terminal and access point based on $\underline{H}_{up}$ and $\underline{H}_{dn}$, as described above. For follow-on calibration, controller 880 may obtain the downlink steered reference and downlink MIMO pilot, determine the calibration error matrices $Q_{ap,final}$ and $Q_{ut,final}$, update the correction matrix for the user terminal with $Q_{ut,final}$, and send $Q_{ap,final}$ back to the access point. At access point 810, controller 830 may perform processing for pre-calibration, field calibration, and/or follow-on calibration.

The calibration techniques described herein may be implemented by various means. For example, these techniques may be implemented in hardware, software, or a combination thereof. For a hardware implementation, the processing units used to perform pre-calibration, field calibration, and/or follow-on calibration may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the calibration techniques may be implemented with modules (e.g., procedures, functions, and so on) that perform the functions described herein. The software codes may be stored in a memory unit (e.g., memory unit 832 or 882 in FIG. 8) and executed by a processor (e.g., controller 830 or 880). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of calibrating transmitter units and receiver units at a wireless entity in a multiple-input multiple-output (MIMO) communication system, comprising:

obtaining a plurality of first overall gains for a first receiver unit and a plurality of transmitter units, one first overall gain for each transmitter unit, each first overall gain indicative of a combined response for the first receiver unit and the associated transmitter unit, each first overall gain proportional to a ratio of the signal level of a baseband signal sent by the associated transmitter unit to the first receiver unit, to the signal level of the baseband signal received by the first receiver unit from the associated transmitter unit, wherein the first receiver unit is one of a plurality of receiver units;

obtaining a plurality of second overall gains for a first transmitter unit and the plurality of receiver units, one second overall gain for each receiver unit, each second overall gain indicative of a combined response for the first transmitter unit and the associated receiver unit, each second overall gain proportional to a ratio of the signal level of a baseband signal received by the associated receiver unit from the first transmitter unit, to the signal level of the baseband signal sent by the first transmitter unit to the associated receiver unit;

determining a gain of each of the plurality of transmitter units based on the plurality of first overall gains; and determining a gain of each of the plurality of receiver units based on the plurality of second overall gains.

2. The method of claim 1, wherein the act of obtaining the plurality of first overall gains for the first receiver unit and the plurality of transmitter units includes, for each one of the plurality of transmitter units, the transmitter unit sending a test signal to the the first receiver unit, the first receiver unit receiving the test signal from the transmitter unit, and determining the first overall gain for the first receiver unit and the transmitter unit based on a ratio of the received test signal to the sent test signal.

3. The method of claim 1, wherein the gain of each transmitter unit is normalized by the gain of the first transmitter unit, and wherein the gain of each receiver unit is normalized by the gain of the first receiver unit.

4. The method of claim 1, further comprising:

deriving at least one correction matrix based on the gains of the plurality of transmitter units and the gains of the plurality of receiver units, wherein the at least one correction matrix is used to account for responses of the plurality of transmitter units and responses of the plurality of receiver units.

5. The method of claim 1, further comprising:

deriving a first correction matrix based on the gains of the plurality of transmitter units, wherein the first correction matrix is used to account for responses of the plurality of transmitter units; and deriving a second correction matrix based on the gains of the plurality of receiver units, wherein the second correction matrix is used to account for responses of the plurality of receiver units.

6. The method of claim 5, wherein the first correction matrix is an inverse of a first diagonal matrix with the gains of the plurality of transmitter units, and wherein the second correction matrix is an inverse of a second diagonal matrix with the gains of the plurality of receiver units.

7. The method of claim 1, further comprising:

deriving a correction matrix based on gains of the plurality of transmitter units and gains of the plurality of receiver units, wherein the correction matrix is applied on a transmit path and is used to account for responses of the plurality of transmitter units and responses of the plurality of receiver units.

8. The method of claim 7, wherein each element of the correction matrix is a ratio of a corresponding element of a first diagonal matrix and a corresponding element of a second diagonal matrix, and wherein the first diagonal matrix has the gains of the plurality of receiver units as its elements, and the second diagonal matrix has the gains of the plurality of transmitter units as its elements.

9. The method of claim 1, further comprising:
deriving a correction matrix based on gains of the plurality of transmitter units and gains of the plurality of receiver units, wherein the correction matrix is applied on a receive path and is used to account for responses of the plurality of transmitter units and responses of the plurality of receiver units.

10. The method of claim 9, wherein each element of the correction matrix is a ratio of a corresponding element of a first diagonal matrix and a corresponding element of a second diagonal matrix, and wherein the first diagonal matrix has the gains of the plurality of transmitter units as its elements, and the second diagonal matrix has the gains of the plurality of receiver units as its elements.

11. The method of wherein the MIMO communication system utilizes orthogonal frequency division multiplexing (OFDM), and wherein the obtaining a plurality of first overall gains, obtaining a plurality of second overall gains, determining a gain of each of the plurality of transmitter units, and determining a gain of each of the plurality of receiver units are performed for a plurality of subbands.

12. The method of wherein gains of the plurality of transmitter units and gains of the plurality of receiver units are determined for a plurality of operating points.

13. The method of claim 12, wherein each operating point corresponds to a different gain setting or a different temperature.

14. An apparatus in a multiple-input multiple-output (MIMO) communication system, comprising:
a plurality of transmitter units operative to process a plurality of baseband signals for transmission from a plurality of antennas;
a plurality of receiver units operative to process a plurality of received signals from the plurality of antennas; and
a processor operative to obtain a plurality of first overall gains for a first receiver unit and the plurality of transmitter units, one first overall gain for each transmitter unit, each first overall gain indicative of a combined response for the first receiver unit and the associated transmitter unit, wherein the first receiver unit is one of the plurality of receiver units, and wherein each first overall gain is proportional to a ratio of the signal level of a baseband signal sent by the associated transmitter unit to the first receiver unit, to the signal level of the baseband signal received by the first receiver unit from the associated transmitter unit;
obtain a plurality of second overall gains for a first transmitter unit and the plurality of receiver units, one second overall gain for each receiver unit, each second overall gain indicative of a combined response for the first transmitter unit and the associated receiver unit, wherein the first transmitter unit is one of the plurality of transmitter units, and wherein each second overall gain is proportional to a ratio of the signal level of a baseband signal received by the associated receiver unit from the first transmitter unit, to signal level of the baseband signal sent by the first transmitter unit to the associated receiver unit;
determine a gain of each of the plurality of transmitter units based on the plurality of first overall gains, and
determine a gain of each of the plurality of receiver units based on the plurality of second overall gains.

15. The apparatus of claim 14, wherein the processor is further operative to derive a first correction matrix based on the gains of the plurality of transmitter units, wherein the first correction matrix is used to account for responses of the plurality of transmitter units, and
derive a second correction matrix based on the gains of the plurality of receiver units, wherein the second correction matrix is used to account for responses of the plurality of receiver units.

16. The apparatus of claim 14, wherein the processor is further operative to derive a correction matrix based on the gains of the plurality of transmitter units and the gains of the plurality of receiver units, wherein the correction matrix is applied on a transmit path and is used to account for responses of the plurality of transmitter units and responses of the plurality of receiver units.

17. The apparatus of claim 14, wherein the processor is further operative to derive a correction matrix based on the gains of the plurality of transmitter units and the gains of the plurality of receiver units, wherein the correction matrix is applied on a receive path and is used to account for responses of the plurality of transmitter units and responses of the plurality of receiver units.

18. A user terminal comprising the apparatus of claim 14.

19. An access point comprising the apparatus of claim 14.

20. An apparatus in a multiple-input multiple-output (MIMO) communication system, comprising:
means for obtaining a plurality of first overall gains for a first receiver unit and a plurality of transmitter units, one first overall gain for each transmitter unit, each first overall gain indicative of a combined response for the first receiver unit and the associated transmitter unit, each first overall gain proportional to a ratio of the signal level of a baseband signal sent by the associated transmitter unit to the first receiver unit, to the signal level of the baseband signal received by the first receiver unit from the associated transmitter unit,
wherein the first receiver unit is one of a plurality of receiver units;
means for obtaining a plurality of second overall gains for a first transmitter unit and the plurality of receiver units, one second overall gain for each receiver unit, each second overall gain indicative of a combined response for the first transmitter unit and the associated receiver unit, each second overall gain proportional to a ratio of the signal level of a baseband signal received by the associated receiver unit from the first transmitter unit, to signal level of the baseband signal sent by the first transmitter unit to the associated receiver unit,
wherein the first transmitter unit is one of the plurality of transmitter units;
means for determining a gain of each of the plurality of transmitter units based on the plurality of first overall gains; and
means for determining a gain of each of the plurality of receiver units based on the plurality of second overall gains.

21. The apparatus of claim 20, further comprising:
means for deriving a first correction matrix based on gains of the plurality of transmitter units, wherein the first correction matrix is used to account for responses of the plurality of transmitter units; and
means for deriving a second correction matrix based on gains of the plurality of receiver units, wherein the second correction matrix is used to account for responses of the plurality of receiver units.

22. The apparatus of claim 20, further comprising:
means for deriving a correction matrix based on the gains of the plurality of transmitter units and the gains of the plurality of receiver units, wherein the correction matrix is applied on a transmit path and is used to account for responses of the plurality of transmitter units and responses of the plurality of receiver units.

23. The apparatus of claim 20, further comprising:
means for deriving a correction matrix based on the gains of the plurality of transmitter units and the gains of the plurality of receiver units, wherein the correction matrix is applied on a receive path and is used to account for responses of the plurality of transmitter units and responses of the plurality of receiver units.

24. A method of calibrating transmitter units and receiver units at a first wireless entity in a multiple-input multiple-output (MIMO) communication system, comprising:
performing a first calibration to obtain a gain of each of a plurality of transmitter units at the wireless entity and to obtain a gain of each of a plurality of receiver units at the wireless entity,
wherein the first calibration is performed based on a plurality of test signals sent via the plurality of transmitter units and received via the plurality of receiver units,
wherein the gain of each transmitter unit is proportional to a ratio of the signal level of one of the test signals sent by that transmitter unit and received by an associated receiver unit, and
wherein the gain of each receiver unit is proportional to a ratio of the signal level of one of the test signals received by that receiver unit and sent by an associated transmitter unit; and
deriving at least one correction matrix based on gains of the plurality of transmitter units and gains of the plurality of receiver units, wherein the at least one correction matrix is used to account for responses of the plurality of transmitter units and responses of the plurality of receiver units.

25. The method of claim 24, further comprising:
performing a second calibration to determine at least one updated correction matrix for the wireless entity, wherein the second calibration is performed based on a channel response estimate for a downlink and a channel response estimate for an uplink in the MIMO system.

26. The method of claim 25, further comprising:
performing a third calibration to determine errors in the at least one correction matrix, wherein the third calibration is performed using two different pilots transmitted by the first wireless entity to a second wireless entity, the second wireless entity configured to estimate the errors in the correction matrix based on the two different pilots; and
updating the at least one correction matrix based on the determined errors in the at least one correction matrix.

27. An apparatus in a multiple-input multiple-output (MIMO) communication system, comprising:
a plurality of transmitter units operative to process a plurality of baseband signals for transmission from a plurality of antennas;
a plurality of receiver units operative to process a plurality of received signals from the plurality of antennas; and
a processor operative to perform a first calibration to obtain a gain of each of the plurality of transmitter units and to obtain a gain of each of the plurality of receiver units, wherein the first calibration is performed based on a plurality of test signals sent via the plurality of transmitter units and received via the plurality of receiver units, and
derive at least one correction matrix based on gains of the plurality of transmitter units and gains of the plurality of receiver units, wherein the at least one correction matrix is used to account for responses of the plurality of transmitter units and responses of the plurality of receiver units;
wherein the gain of each of the transmitter units is proportional to a ratio of the signal level of one of the test signals sent by that transmitter unit to the signal level of that test signal received by an associated receiver unit, and
wherein the gain of each of the receiver units is proportional to a ratio of the signal level of one of the test signals received by that receiver unit to the signal level of that test signal sent by an associated transmitter unit.

28. The apparatus of claim 27, wherein the processor is further operative to
perform a second calibration to determine at least one updated correction matrix, wherein the second calibration is performed based on a channel response estimate for a downlink and a channel response estimate for an uplink in the MIMO system.

29. The apparatus of claim 28, wherein the processor is further operative to
perform a third calibration to determine errors in the at least one correction matrix, wherein the third calibration is performed based on two different pilots received via the plurality of receiver units, and
update the at least one correction matrix based on the determined errors in the at least one correction matrix.

30. An apparatus in a multiple-input multiple-output (MIMO) communication system, comprising:
means for performing a first calibration to obtain a gain of each of a plurality of transmitter units and to obtain a gain of each of a plurality of receiver units, wherein the first calibration is performed based on a plurality of test signals sent via the plurality of transmitter units and received via the plurality of receiver units,
wherein the gain of each of the transmitter units is proportional to a ratio of the signal level of one of the test signals sent by that transmitter unit to the signal level of the test signal received by an associated receiver unit, and
wherein the gain of each of the receiver units is proportional to a ratio of the signal level of one of the test signals received by that receiver unit to the signal level of the test signal sent by an associated transmitter unit; and
means for deriving at least one correction matrix based on gains of the plurality of transmitter units and gains of the plurality of receiver units, wherein the at least one correction matrix is used to account for responses of the plurality of transmitter units and responses of the plurality of receiver units.

31. The apparatus of claim 30, further comprising:
means for performing a second calibration to determine at least one updated correction matrix, wherein the second calibration is performed based on a channel response estimate for a downlink and a channel response estimate for an uplink in the MIMO system.

32. The apparatus of claim 31, further comprising:
means for performing a third calibration to determine errors in the at least one correction matrix, wherein the third calibration is performed based on two different pilots received via the plurality of receiver units; and
means for updating the at least one correction matrix based on the determined errors in the at least one correction matrix.

* * * * *